(12) United States Patent
Hsu et al.

(10) Patent No.: US 10,935,766 B2
(45) Date of Patent: Mar. 2, 2021

(54) OPTICAL PHOTOGRAPHING LENS ASSEMBLY, IMAGING APPARATUS AND ELECTRONIC DEVICE

(71) Applicant: LARGAN PRECISION CO., LTD., Taichung (TW)

(72) Inventors: Po-Lun Hsu, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 166 days.

(21) Appl. No.: 16/121,808

(22) Filed: Sep. 5, 2018

(65) Prior Publication Data
US 2019/0271831 A1 Sep. 5, 2019

(30) Foreign Application Priority Data
Mar. 2, 2018 (TW) ................. 107107118

(51) Int. Cl.
| G02B 13/18 | (2006.01) |
| G02B 13/00 | (2006.01) |
| G02B 9/64 | (2006.01) |
| G02B 5/20 | (2006.01) |
| G02B 27/00 | (2006.01) |
| G02B 5/00 | (2006.01) |

(52) U.S. Cl.
CPC ......... *G02B 13/0045* (2013.01); *G02B 5/208* (2013.01); *G02B 9/64* (2013.01); *G02B 27/0025* (2013.01); *G02B 5/005* (2013.01); *G02B 13/002* (2013.01); *G02B 13/18* (2013.01)

(58) Field of Classification Search
CPC ....................... G02B 13/0045; G02B 27/0025; G02B 13/18; G02B 5/005; G02B 13/002; G02B 5/208
USPC ......................................... 359/708, 740, 755
See application file for complete search history.

(56) References Cited

U.S. PATENT DOCUMENTS

| 5,200,861 | A | 4/1993 | Moskovich |
| 8,736,979 | B2 | 5/2014 | Tsai et al. |
| 9,297,983 | B2 | 3/2016 | Kubota |
| 9,753,257 | B2* | 9/2017 | Tanaka ............... G02B 13/0045 |
| 9,874,725 | B2 | 1/2018 | Lai et al. |
| 2013/0242414 | A1 | 9/2013 | Iwamoto |
| 2014/0043694 | A1* | 2/2014 | Tsai ................ G02B 9/64 359/708 |
| 2014/0139931 | A1 | 5/2014 | Kubota |
| 2015/0185441 | A1 | 7/2015 | Liao |

(Continued)

FOREIGN PATENT DOCUMENTS

| CN | 106291882 A | 1/2017 |
| CN | 106959505 A | 7/2017 |

(Continued)

*Primary Examiner* — Evelyn A Lester
(74) *Attorney, Agent, or Firm* — McClure, Qualey & Rodack, LLP

(57) ABSTRACT

An optical photographing lens assembly includes seven lens elements, which are, in order from an object side to an image side, a first lens element, a second lens element, a third lens element, a fourth lens element, a fifth lens element, a sixth lens element and a seventh lens element. The first lens element has negative refractive power. The sixth lens element has positive refractive power. At least one of an object-side surface and an image-side surface of the seventh lens element includes at least one inflection point.

30 Claims, 24 Drawing Sheets

(56) References Cited

U.S. PATENT DOCUMENTS

| | | |
|---|---|---|
| 2015/0226936 A1 | 8/2015 | Suzuki et al. |
| 2015/0241666 A1 | 8/2015 | Koida et al. |
| 2015/0268449 A1* | 9/2015 | Kurioka et al. ... G02B 13/0045 359/740 |
| 2016/0109687 A1 | 4/2016 | Son |
| 2016/0139372 A1 | 5/2016 | Tanaka |
| 2016/0377839 A1 | 12/2016 | Chen et al. |
| 2017/0199355 A1 | 7/2017 | Kitahara et al. |
| 2017/0227733 A1 | 8/2017 | Lin et al. |
| 2017/0254983 A1 | 9/2017 | Lai et al. |
| 2017/0336605 A1 | 11/2017 | Lai et al. |
| 2018/0031807 A1 | 2/2018 | Chen et al. |
| 2018/0172963 A1 | 6/2018 | Kim et al. |
| 2019/0187443 A1 | 6/2019 | Jia et al. |

FOREIGN PATENT DOCUMENTS

| | | |
|---|---|---|
| CN | 106990510 A | 7/2017 |
| CN | 107065141 A | 8/2017 |
| CN | 107402436 A | 11/2017 |
| CN | 107728290 A | 2/2018 |
| CN | 108181701 A | 6/2018 |
| JP | 07-120672 A | 5/1995 |
| JP | 2014095841 A | 5/2014 |
| JP | 2014102358 A | 6/2014 |
| JP | 2014160105 A | 9/2014 |
| JP | 2014160106 A | 9/2014 |
| JP | 2014219609 A | 11/2014 |
| JP | 2016194653 A | 11/2016 |
| JP | 2017125887 A | 7/2017 |
| TW | 201804209 A | 2/2018 |
| WO | 2014192567 A1 | 12/2014 |
| WO | 2018056555 A1 | 3/2018 |

* cited by examiner

OPTICAL PHOTOGRAPHING LENS ASSEMBLY, IMAGING APPARATUS AND ELECTRONIC DEVICE

RELATED APPLICATIONS

This application claims priority to Taiwan Application Serial Number 107107118, filed Mar. 2, 2018, which is herein incorporated by reference.

BACKGROUND

Technical Field

The present disclosure relates to an optical photographing lens assembly and an imaging apparatus. More particularly, the present disclosure relates to an optical photographing lens assembly and an imaging apparatus with compact size applicable to electronic devices.

Description of Related Art

With recent technology of semiconductor process advances, performances of image sensors are enhanced, so that the smaller pixel size can achieved. Therefore, optical lens assemblies with high image qualities have become an indispensable part. With rapid developments of technology, application of electronic device equipped with optical lens assembly becomes wider and requirements for optical lens assembly are further diverse. However, in conventional optical lens assembly, it is hard to obtain balance among the image quality, photosensitivity, aperture size, volume or field of view, thus, one optical lens assembly that meets the aforementioned needs has become a goal of the industry.

SUMMARY

According to one aspect of the present disclosure, an optical photographing lens assembly includes seven lens elements, the seven lens elements being, in order from an object side to an image side, a first lens element, a second lens element, a third lens element, a fourth lens element, a fifth lens element, a sixth lens element and a seventh lens element. The first lens element has negative refractive power. The sixth lens element has positive refractive power. At least one of an object-side surface and an image-side surface of the seventh lens element includes at least one inflection point. When a focal length of the first lens element is f1, a focal length of the seventh lens element is f7, an axial distance between an object-side surface of the first lens element and an image surface is TL, a maximum image height of the optical photographing lens assembly is ImgH, a maximum refractive index of a single lens element of the optical photographing lens assembly is Nmax, a curvature radius of an object-side surface of the third lens element is R5, and a curvature radius of an image-side surface of the third lens element is R6, the following conditions are satisfied:

$|f1/f7|<1.50;$ $TL/ImgH<3.20;$ $1.550<Nmax<1.750;$ and $-1.20<(R5+R6)/(R5-R6).$ According to another aspect of the present disclosure, an imaging apparatus includes the optical photographing lens assembly of the aforementioned aspect and an image sensor, wherein the image sensor is disposed on the image surface of the optical photographing lens assembly.

According to another aspect of the present disclosure, an electronic device includes at least two imaging apparatuses. The at least two imaging apparatuses includes a first imaging apparatus and a second imaging apparatus, wherein the first imaging apparatus and the second imaging apparatus face toward a same direction, and each of the first imaging apparatus and the second imaging apparatus has single focus. The first imaging apparatus includes a lens assembly and a first image sensor, the first image sensor is disposed on an image surface of the lens assembly, and the first imaging apparatus has a field of view ranging between 60 degrees and 90 degrees. The second imaging apparatus includes the optical photographing lens assembly of claim 1 and a second image sensor, the second image sensor is disposed on the image surface of the optical photographing lens assembly, and the second imaging apparatus has a field of view ranging between 90 degrees and 180 degrees.

According to another aspect of the present disclosure, an optical photographing lens assembly includes seven lens elements, the seven lens elements being, in order from an object side to an image side, a first lens element, a second lens element, a third lens element, a fourth lens element, a fifth lens element, a sixth lens element and a seventh lens element. The first lens element has negative refractive power. The sixth lens element has positive refractive power. At least one of an object-side surface and an image-side surface of the seventh lens element includes at least one inflection point. When a focal length of the first lens element is f1, a focal length of the seventh lens element is f7, an axial distance between an object-side surface of the first lens element and an image surface is TL, a maximum image height of the optical photographing lens assembly is ImgH, a half of a maximum field of view of the optical photographing lens assembly is HFOV, a curvature radius of an object-side surface of the third lens element is R5, and a curvature radius of an image-side surface of the third lens element is R6, the following conditions are satisfied:

$|f1/f7|<3.0;$ $TL/Img_H<3.20;$ $1/|tan(HFOV)|<1.0;$ and $-1.20<(R5+R6)/(R5-R6)<10.0.$ According to another aspect of the present disclosure, an optical photographing lens assembly includes seven lens elements, the seven lens elements being, in order from an object side to an image side, a first lens element, a second lens element, a third lens element, a fourth lens element, a fifth lens element, a sixth lens element and a seventh lens element. The first lens element has negative refractive power. The second lens element has an object-side surface being convex in a paraxial region thereof and an image-side surface being concave in a paraxial region thereof. The sixth lens element has positive refractive power. At least one of an object-side surface and an image-side surface of the seventh lens element includes at least one inflection point. When a focal length of the first lens element is f1, a focal length of the seventh lens element is f7, an axial distance between an object-side surface of the first lens element and an image surface is TL, a maximum image height of the optical photographing lens assembly is ImgH, a focal length of the optical photographing lens assembly is f, and an entrance pupil diameter of the optical photographing lens assembly is EPD, the following conditions are satisfied:

$|f1/f7|<1.50;$ $TL/ImgH<4.70;$ and $1.20<f/EPD<2.40.$

DETAILED DESCRIPTION

Figure 1:
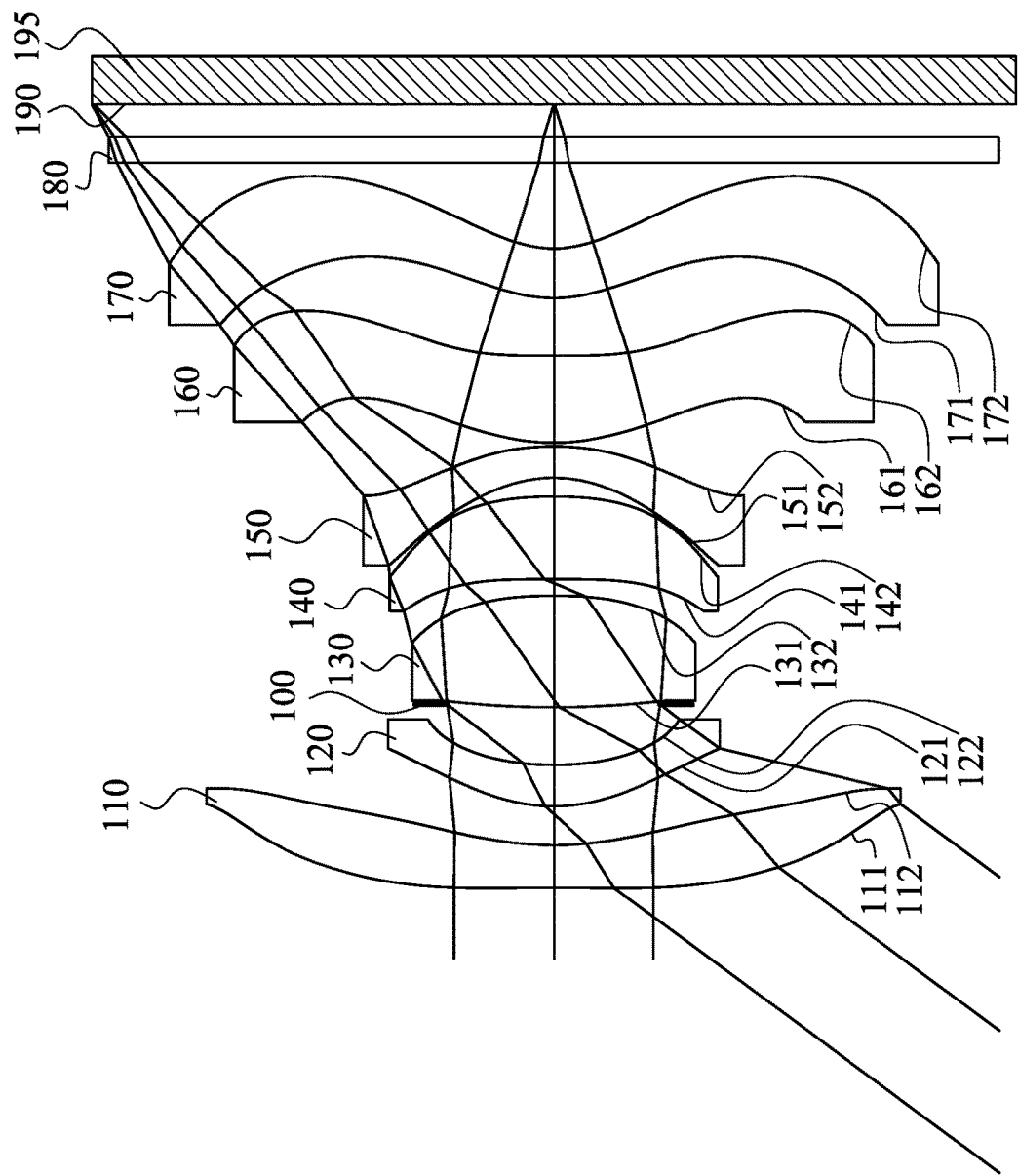
FIG. 1 is a schematic view of an imaging apparatus according to the 1st embodiment of the present disclosure.

An optical photographing lens assembly includes seven lens elements, which are, in order from an object side to an image side, a first lens element, a second lens element, a third lens element, a fourth lens element, a fifth lens element, a sixth lens element and a seventh lens element.

According to the optical photographing lens assembly of the present disclosure, there is an air gap in a paraxial region between each of adjacent lens elements of the first lens element, the second lens element, the third lens element, the fourth lens element, the fifth lens element, the sixth lens element and the seventh lens element. That is, each of the seven lens elements is a single and non-cemented lens element, and there is a space between each of adjacent lens elements. The manufacturing process of the cemented lenses is more complex than the non-cemented lenses. In particular, a cementing surface of one lens element and the following lens element need to have accurate curvature to ensure these two lens elements being highly cemented. However, during the cementing process, these two lens elements might not be highly cemented due to displacements and it is thereby not favorable for image quality of the optical photographing lens assembly. Therefore, according to the optical photographing lens assembly of the present disclosure, having an air gap in a paraxial region between each of adjacent lens elements avoids the problem generated by the cemented lens elements.

The first lens element has negative refractive power, so that it is favorable for forming a lens structure with a short focal length so as to allow light with large angle of view to enter the optical photographing lens assembly. At least one of an object-side surface and an image-side surface of the first lens element can include at least one inflection point. Thus, it is favorable for reducing the incident angle of the first lens element by adjusting the surface variation of the first lens element so as to reduce surface reflection.

The second lens element has an object-side surface being convex in a paraxial region thereof, so that the shape of the object-side surface of the second lens element can be controlled, which is favorable for receiving the incident light of a large angle of view in the optical photographing lens assembly. The second lens element has an image-side surface being concave in a paraxial region thereof, so that it is favorable for improving the image quality by correcting aberrations on the object side of the optical photographing lens assembly.

The third lens element can have positive refractive power, so that it is favorable for balancing the refractive power of the object side of the optical photographing lens assembly so as to reduce the photosensitivity by adjusting the refractive power of the third lens element. The third lens element can have an object-side surface being convex in a paraxial region thereof, so that it is favorable for moderating the incident light of a large angle of view and reducing spherical aberration of the optical photographing lens assembly by controlling the object-side surface shape of the third lens element.

The fifth lens element can have negative refractive power, so that it is favorable for correcting chromatic aberration of the optical photographing lens assembly so as to optimize the image quality by adjusting the refractive power of the fifth lens element. The fifth lens element can have an image-side surface being convex in a paraxial region thereof, so that it is favorable for correcting astigmatism so as to further optimize the image quality by controlling the shape of the image-side surface of the fifth lens element.

The sixth lens element has positive refractive power, so that it is favorable for forming a wide-angle structure and providing sufficient light converging ability so as to reduce the total track length thereof. At least one of an object-side surface and an image-side surface of the sixth lens element can include at least one inflection point. Therefore, it is favorable for receiving the off-axis light by adjusting the shape variation of the surfaces of the sixth lens element, so that the stray light generated by an overly large incident angle can be avoided so as to maintain good image quality.

At least one of an object-side surface and an image-side surface of the seventh lens element includes at least one inflection point. Therefore, it is favorable for reducing the back focal length of the optical photographing lens assembly so as to obtain the compactness of the optical photographing lens assembly, and also favorable for correcting the field curvature and effectively reducing the incident angle on the image surface so as to enhance the image quality in the off-axis region. The seventh lens element can have an object-side surface being convex in a paraxial region thereof and an image-side surface being concave in a paraxial region thereof. Therefore, it is favorable for reducing the total track length of the optical photographing lens assembly and correcting the aberrations thereof by controlling the shape of the seventh lens element.

When a focal length of the first lens element is f1, and a focal length of the seventh lens element is f7, the following condition is satisfied: $|f1/f7|<3.0$. Therefore, the ratio of the refractive power of the first lens element and the seventh lens element can be adjusted, so that it is favorable for forming the wide-angle lens structure by receiving light from the large angle of view and correcting the aberrations generated therefrom. Preferably, the following condition can be satisfied: $|f1/f7|<1.50$. More preferably, the following condition can be satisfied: $|f1/f7|<0.65$.

When an axial distance between the object-side surface of the first lens element and an image surface is TL, and a maximum image height of the optical photographing lens assembly is ImgH, the following condition is satisfied: $TL/ImgH<4.70$. Therefore, it is favorable for reducing the size of the optical photographing lens assembly so as to obtain compactness by properly controlling the specification thereof, and also favorable for enlarging the image surface so as to be utilized in a wider range of applications. Preferably, the following condition can be satisfied: $TL/ImgH<4.0$. More preferably, the following condition can be satisfied: $TL/ImgH<3.20$. Furthermore, the following condition can be satisfied: $1.0<TL/ImgH<2.30$.

When a maximum refractive index of a single lens element of the optical photographing lens assembly is Nmax, the following condition is satisfied: $1.550<Nmax<1.750$. Therefore, it is favorable for reducing manufacturing costs and obtaining compactness by properly arranging the material of each lens element of the optical photographing lens assembly.

When a curvature radius of the object-side surface of the third lens element is R5, and a curvature radius of the image-side surface of the third lens element is R6, the following condition is satisfied: $-1.20<(R5+R6)/(R5-R6)$. Therefore, it is favorable for reducing the aberrations generated by the large angle of view and also reducing the photosensitivity of the optical photographing lens assembly by adjusting the shape of the third lens element. Preferably, the following condition can be satisfied: $-1.20<(R5+R6)/(R5-R6)<10.0$. More preferably, the following condition can be satisfied: $-0.60<(R5+R6)/(R5-R6)<5.0$. Furthermore, the following condition can be satisfied: $-0.05<(R5+R6)/(R5-R6)<2.0$.

When half of a maximum field of view of the optical photographing lens assembly is HFOV, the following condition is satisfied: $1/|\tan(HFOV)|<1.0$. Therefore, it is favorable for increasing the angle of view of the optical photographing lens assembly effectively and providing for a wider range of applicable products. Preferably, the following condition can be satisfied: $1/|\tan(HFOV)|<0.75$.

When a focal length of the optical photographing lens assembly is f, and an entrance pupil diameter of the optical photographing lens assembly is EPD, the following condition is satisfied: $1.0<f/EPD<2.65$. Therefore, the amount of incident light can be controlled so as to enhance the illumination of the image surface, and it is favorable for the imaging apparatus including the optical photographing lens assembly to obtain sufficient information in situations with insufficient external light sources (i.e. nighttime), or under short exposure time (dynamic photographing) etc., so that the electronic device including the imaging apparatus can provide satisfactory image quality supported by image post processing so as to increase the range of viable applications thereof. Preferably, the following condition can be satisfied: $1.20<f/EPD\leq2.40$. More preferably, the following condition can be satisfied: $1.20<f/EPD\leq2.20$.

When half of a maximum field of view of the optical photographing lens assembly is HFOV, the following condition is satisfied: $45.0\ degrees<HFOV<120.0\ degrees$. Therefore, it is favorable for increasing the angle of view of the optical photographing lens assembly effectively so as to expand the range of applicable products.

When a maximum effective radius of the object-side surface of the first lens element is Y11, and a maximum effective radius of the image-side surface of the seventh lens element is Y72, the following condition is satisfied: $0.20<Y11/Y72<1.0$. Therefore, the ratio of the optical effective radii of the lens elements on the object side and the image side of the optical photographing lens assembly can be controlled, so that it is favorable for forming the compact wide-angle lens structure so as to satisfy various applications. Preferably, the following condition can be satisfied: $0.55<Y11/Y72<0.95$.

When a curvature radius of the object-side surface of the second lens element is R3, a curvature radius of the image-side surface of the second lens element is R4, the following condition is satisfied: $-9.0<(R3+R4)/(R3-R4)<0.80$. Therefore, it is favorable for correcting aberrations of the optical photographing lens assembly so as to maintain good image quality by adjusting the shape of the second lens element. Preferably, the following condition can be satisfied: $-9.0<(R3+R4)/(R3-R4)<-1.50$.

When the focal length of the optical photographing lens assembly is f, the axial distance between the object-side surface of the first lens element and the image surface is TL, and the maximum image height of the optical photographing lens assembly is ImgH, the following condition is satisfied: $1.0<(f+TL)/ImgH<2.90$. Therefore, it is favorable for obtaining the proper balance among a large angle of view, compactness and a sufficient image capturing range by adjusting the specification of the optical photographing lens assembly.

When a curvature radius of the object-side surface of the fifth lens element is R9, and a curvature radius of the image-side surface of the fifth lens element is R10, the following condition is satisfied: $-8.0<(R9+R10)/(R9-R10)<0.80$. Therefore, it is favorable for correcting chromatic aberration of the optical photographing lens assembly so as to enhance the image quality by adjusting the shape of the fifth lens element.

When an axial distance between the image-side surface of the seventh lens element and the image surface is BL, and the focal length of the optical photographing lens assembly is f, the following condition is satisfied: $0.25<BL/f<0.85$. Therefore, it is favorable for reducing the back focal length and further minimizing the size of the optical photographing lens assembly.

When an Abbe number of the second lens element is V2, an Abbe number of the fifth lens element is V5, and an Abbe number of the seventh lens element is V7, the following condition is satisfied: $30.0<V2+V5+V7<115.0$. Therefore, it is favorable for effectively improving aberration corrections so as to satisfy the stricter specification demand by adjusting the arrangement of the material of the lens elements.

The optical photographing lens assembly can further include an aperture stop, wherein an axial distance between the aperture stop and the image-side surface of the seventh lens element is SD, and an axial distance between the object-side surface of the first lens element and the image-side surface of the seventh lens element is TD, the following condition is satisfied: $1.20<TD/SD<2.0$. Therefore, it is favorable for enlarging the field of view of the optical photographing lens assembly and also maintaining the imaging efficiency of the image sensor by adjusting the location of the aperture stop.

When a sum of axial distances between all adjacent lens elements of the optical photographing lens assembly is $\Sigma AT$, and a sum of central thicknesses of all lens elements of the optical photographing lens assembly is $\Sigma CT$, the following condition is satisfied: $0.10<\Sigma AT/\Sigma CT<0.65$. Therefore, it is favorable for efficiently utilizing space and maintaining a high yield rate of assembling by balancing the space arrangement among the lens elements.

When a central thickness of the second lens element is CT2, and a central thickness of the seventh lens element is CT7, the following condition is satisfied: $0.75<CT7/CT2<2.0$. Therefore, the thickness ratio of the lens elements of the optical photographing lens assembly can be controlled, so that it is favorable for avoiding the imbalance of the lens spacing which would affect the image quality. Preferably, the following condition can be satisfied: $0.85<CT7/CT2<1.85$.

When a focal length of the second lens element is f2, and a focal length of the fourth lens element is f4, the following condition is satisfied: $-0.45<f4/f2<2.50$. Therefore, it is favorable for reducing the photosensitivity of the optical photographing lens assembly and optimizing the image quality by arranging the refractive power of the second lens element and the fourth lens element. Preferably, the following condition can be satisfied: $0.20<f4/f2<1.60$.

When a curvature radius of the image-side surface of the seventh lens element is R14, and the maximum effective radius of the image-side surface of the seventh lens element is Y72, the following condition is satisfied: $0<R14/Y72<1.0$. Therefore, it is favorable for reducing the total track length of the optical photographing lens assembly and also enlarging the imaging area by adjusting the ratio between the curvature radius of the image-side surface of the seventh lens element and the maximum effective radius thereof.

When the Abbe number of the seventh lens element is V7, the following condition is satisfied: $10.0<V7<45.0$. Therefore, it is favorable for effectively correcting chromatic aberration of the optical photographing lens assembly by adjusting the material of the seventh lens element, so that image overlaps can be avoided so as to enhance the image quality.

When the axial distance between the image-side surface of the seventh lens element and the image surface is BL, and the maximum image height of the optical photographing lens assembly is ImgH, the following condition is satisfied: $BL/ImgH<0.50$. Therefore, it is favorable for effectively reducing the back focal length of the optical photographing lens assembly and also enlarging the imaging range.

When a curvature radius of the object-side surface of the seventh lens element is R13, and a curvature radius of the image-side surface of the seventh lens element is R14, the following condition is satisfied: $-0.20<(R13-R14)/(R13+R14)<1.0$. Therefore, it is favorable for balancing between compactness and good image quality by adjusting the shape of the seventh lens element. Preferably, the following condition can be satisfied: $0<(R13-R14)/(R13+R14)<0.50$.

When the focal length of the optical photographing lens assembly is f, and a focal length of the third lens element is f3, the following condition is satisfied: $0.43<f/f3<1.20$. Therefore, it is favorable for providing sufficient positive refractive power by controlling the refractive power of the third lens element, so that the refractive power of the object side of the optical photographing lens assembly can be balanced so as to reduce the total track length thereof.

When a central thickness of the sixth lens element is CT6, and the central thickness of the seventh lens element is CT7, the following condition is satisfied: $0.15<CT7/CT6<0.85$. Therefore, it is favorable for adjusting the lens spacing on the image side of the optical photographing lens assembly and forming the lens elements while maintaining the production stability.

When a distance perpendicular to an optical axis between an inflection point on the object-side surface of the sixth lens element closest to the optical axis and the optical axis is Yp61, a distance perpendicular to the optical axis between an inflection point on the image-side surface of the sixth lens element closest to the optical axis and the optical axis is Yp62, and the focal length of the optical photographing lens assembly is f, one of the following condition is satisfied: $0<Yp61/f<1.50$; or $0<Yp62/f<1.50$. Therefore, it is favorable for correcting the distortion of the off-axis region by adjusting the variation of the surface shape of the sixth lens element so as to avoid image distortion.

Each of the aforementioned features of the optical photographing lens assembly can be utilized in various combinations for achieving the corresponding effects.

According to the optical photographing lens assembly of the present disclosure, the lens elements thereof can be made of glass or plastic materials. When the lens elements are made of glass materials, the distribution of the refractive power of the optical photographing lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the optical photographing lens assembly. Therefore, the total track length of the optical photographing lens assembly can also be reduced.

According to the optical photographing lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the optical photographing lens assembly of the present disclosure, the refractive power or the focal length of a lens element being positive or negative may refer to the refractive power or the focal length in a paraxial region of the lens element.

According to the optical photographing lens assembly of the present disclosure, the image surface of the optical photographing lens assembly, based on the corresponding image sensor, can be flat or curved. In particular, the image surface can be a concave curved surface facing towards the object side. According to the optical photographing lens assembly of the present disclosure, at least one image correcting element (such as a field flattener) can be selectively disposed between the lens element closest to the image side of the optical photographing lens assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin piano-concave element having a concave surface toward the object side and is disposed close to the image surface.

According to the optical photographing lens assembly of the present disclosure, the optical photographing lens assembly can include at least one stop, such as an aperture stop, a glare stop or a field stop. Said glare stop or said field stop is for eliminating the stray light and thereby improving the image resolution thereof.

According to the optical photographing lens assembly of the present disclosure, an aperture stop can be configured as a front stop or a middle stop. A front stop disposed between an object and the first lens element can provide a longer distance between an exit pupil of the optical photographing lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the optical photographing lens assembly and thereby provides a wider field of view for the same.

According to the optical photographing lens assembly of the present disclosure, a critical point is a non-axial point of the lens surface where its tangent is perpendicular to the optical axis.

According to the optical photographing lens assembly of the present disclosure, an inflection point is defined as a point where center of curvature is shifted from the object side to the image side (or from the image side to the object side) of a curve on the lens surface from a paraxial region thereof to the off-axis region thereof.

According to the optical photographing lens assembly of the present disclosure, the optical photographing lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an imaging apparatus is provided. The imaging apparatus includes the aforementioned optical photographing lens assembly and an image sensor, wherein the image sensor is disposed on the image side of the aforementioned optical photographing lens assembly, that is, the image sensor can be disposed on or near the image surface of the aforementioned optical photographing lens assembly. It is favorable for enlarging the receiving range of light, obtaining compactness and the image quality by the arrangements of the first lens element with negative refractive power, the sixth lens element with positive refractive power and the seventh lens element including at least one inflection point on at least one surface thereof. Preferably, the imaging apparatus can further include a barrel member, a holder member or a combination thereof.

According to the present disclosure, an electronic device is provided, which includes the aforementioned imaging apparatus. Thus, the image quality can be enhanced. In detail, the electronic device can include at least two imaging apparatuses, which include a first imaging apparatus and a second imaging apparatus, wherein the first imaging apparatus and the second imaging apparatus face toward a same direction, and each of the first imaging apparatus and the second imaging apparatus has single focus. The first imaging apparatus includes a lens assembly and a first image sensor, the first image sensor is disposed on an image surface of the lens assembly, and the first imaging apparatus has a field of view ranging between 60 degrees and 90 degrees. Thus, the preferable image quality in the general field of view can be obtained. The second imaging apparatus includes the aforementioned optical photographing lens assembly and a second image sensor, the second image sensor is disposed on the image surface of the optical photographing lens assembly, and the second imaging apparatus has a field of view ranging between 90 degrees and 180 degrees. Therefore, the wide-angle photographing can be provided. Preferably, the electronic device can further include but not limited to a control unit, a display, a storage unit, a random access memory unit (RAM) or a combination thereof.

According to the above description of the present disclosure, the following 1st—12th specific embodiments are provided for further explanation.

1st Embodiment

Figure 2:
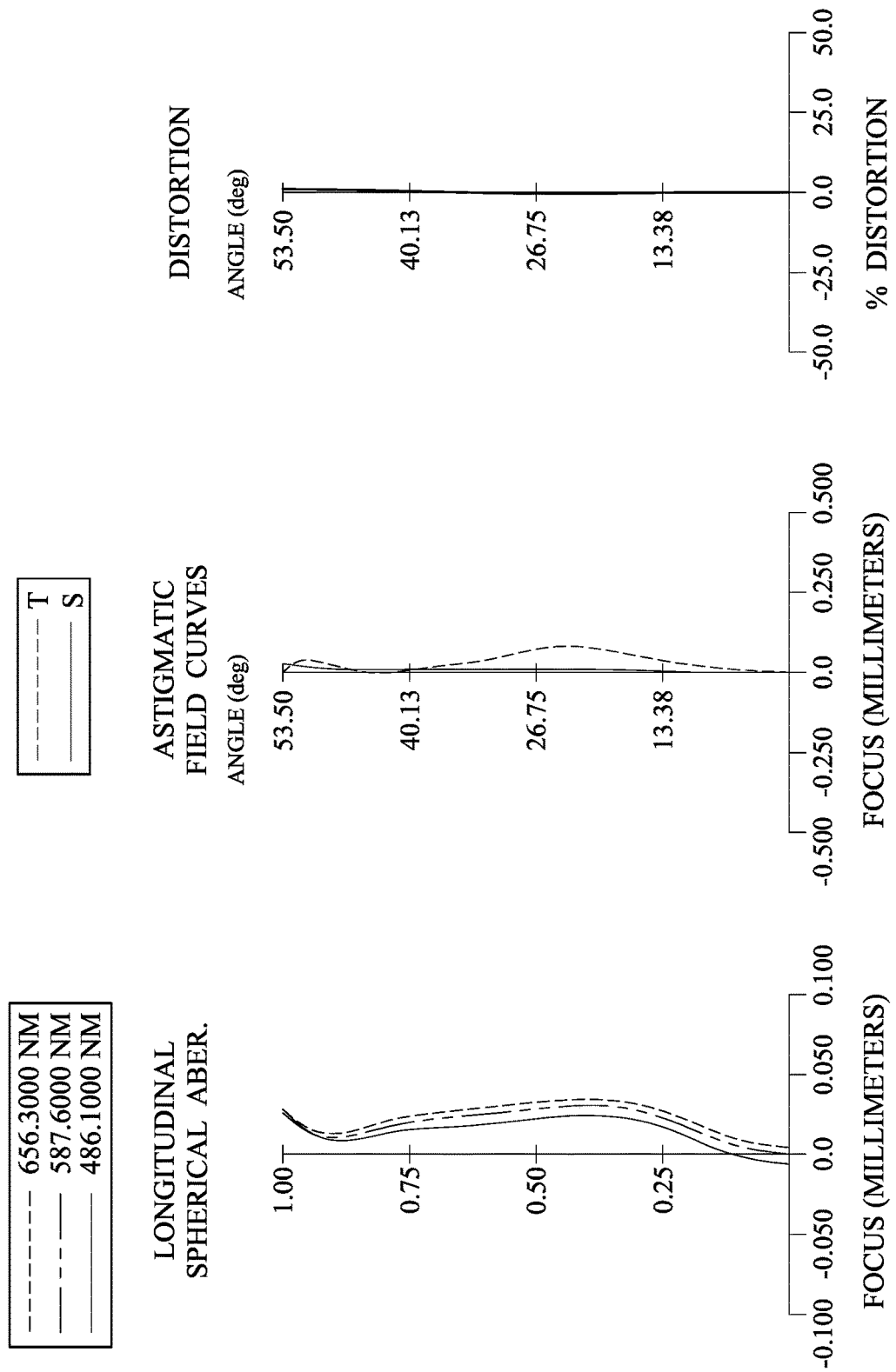
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an optical photographing lens assembly (its reference numeral is omitted) and an image sensor 195. The optical photographing lens assembly includes, in order from an object side to an image side, a first lens element 110, a second lens element 120, an aperture stop 100, a third lens element 130, a fourth lens element 140, a fifth lens element 150, a sixth lens element 160, a seventh lens element 170, a filter 180 and an image surface 190, wherein the image sensor 195 is disposed on the image surface 190 of the optical photographing lens assembly. The optical photographing lens assembly includes seventh lens elements (110, 120, 130, 140, 150, 160, 170) with air gaps between all adjacent lens elements, and without additional one or more lens elements inserted between the first lens element 110 and the seventh lens element 170.

The first lens element 110 with negative refractive power has an object-side surface 111 being concave in a paraxial region thereof and an image-side surface 112 being concave in a paraxial region thereof. The first lens element 110 is made of a plastic material, and has the object-side surface 111 and the image-side surface 112 being both aspheric. Furthermore, each of the object-side surface 111 and the image-side surface 112 of the first lens element 110 includes at least one inflection point IP11, IP12 (as labeled in FIG. 17).

The second lens element 120 with positive refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, each of the object-side surface 161 and the image-side surface 162 of the sixth lens element 160 includes at least one inflection point IP61, IP62 and at least one critical point CP61, CP62 (as labeled in FIG. 17).

The seventh lens element 170 with negative refractive power has an object-side surface 171 being convex in a paraxial region thereof and an image-side surface 172 being concave in a paraxial region thereof. The seventh lens element 170 is made of a plastic material, and has the object-side surface 171 and the image-side surface 172 being both aspheric. Furthermore, each of the object-side surface 171 and the image-side surface 172 of the seventh lens element 170 includes at least one inflection point IP71, IP72 and at least one critical point CP71, CP72 (as labeled in FIG. 17).

The filter 180 is made of a glass material and located between the seventh lens element 170 and the image surface 190, and will not affect the focal length of the optical photographing lens assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i)$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical photographing lens assembly according to the 1st embodiment, when a focal length of the optical photographing lens assembly is f, an f-number of the optical photographing lens assembly is Fno, and half of a maximum field of view of the optical photographing lens assembly is HFOV, these parameters have the following values: f=2.36 mm; Fno=1.70; and HFOV=53.5 degrees.

In the optical photographing lens assembly according to the 1st embodiment, when half of a maximum field of view of the optical photographing lens assembly is HFOV, the following condition is satisfied: 1/|tan(HFOV)|=0.74.

In the optical photographing lens assembly according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, and a maximum refractive index of a single lens element of the optical photographing lens assembly is Nmax (that is, a maximum value of N1, N2, N3, N4, N5, N6 and N7; according to the first embodiment, Nmax=N5), the following condition is satisfied: Nmax=1.669.

In the optical photographing lens assembly according to the 1st embodiment, when an Abbe number of the second lens element 120 is V2, an Abbe number of the fifth lens element 150 is V5, and an Abbe number of the seventh lens element 170 is V7, the following conditions are satisfied: V7=26.6; and V2+V5+V7=83.5.

In the optical photographing lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, a sum of axial distances between all adjacent lens elements of the optical photographing lens assembly that are adjacent to each other is ΣAT (that is, ΣAT=T12+T23+T34+T45+T56+T67), a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, a central thickness of the seventh lens element 170 is CT7, and a sum of central thicknesses of all lens elements of the optical photographing lens assembly is ΣCT (that is, ΣCT=CT1+CT2+CT3+CT4+CT5+CT6+CT7), the following conditions are satisfied: CT7/CT2=1.20; CT7/CT6=0.57; and ΣAT/ΣCT=0.43.

In the optical photographing lens assembly according to the 1st embodiment, when a curvature radius of the object-side surface 121 of the second lens element 120 is R3, a curvature radius of the image-side surface 122 of the second lens element 120 is R4, a curvature radius of the object-side surface 131 of the third lens element 130 is R5, a curvature radius of the image-side surface 132 of the third lens element 130 is R6, a curvature radius of the object-side surface 151 of the fifth lens element 150 is R9, a curvature radius of the image-side surface 152 of the fifth lens element 150 is R10, a curvature radius of the object-side surface 171 of the seventh lens element 170 is R13, a curvature radius of the image-side surface 172 of the seventh lens element 170 is R14, the following conditions are satisfied: (R3+R4)/(R3−R4)=−3.72; (R5+R6)/(R5−R6)=0.32; (R9+R10)/(R9−R10)=−3.01; and (R13−R14)/(R13+R14)=0.15.

In the optical photographing lens assembly according to the 1st embodiment, when an axial distance between the object-side surface 111 of the first lens element 110 and the image surface 190 is TL, a maximum image height of the optical photographing lens assembly is ImgH, the focal length of the optical photographing lens assembly is f, an axial distance between the image-side surface 172 of the seventh lens element 170 and the image surface 190 is BL, the following conditions are satisfied: TL/ImgH=1.70; (f+TL)/ImgH=2.43; BL/ImgH=0.31; and BL/f=0.43.

In the optical photographing lens assembly according to the 1st embodiment, when the focal length of the optical photographing lens assembly is f, and an entrance pupil diameter of the optical photographing lens assembly is EPD, the following condition is satisfied: f/EPD=1.70.

In the optical photographing lens assembly according to the 1st embodiment, when the focal length of the optical photographing lens assembly is f, and a focal length of the third lens element 130 is f3, the following condition is satisfied: f/f3=0.55.

In the optical photographing lens assembly according to the 1st embodiment, when a focal length of the first lens element 110 is f1, and a focal length of the seventh lens element 170 is f7, the following condition is satisfied: |f1/f7|=0.41.

In the optical photographing lens assembly according to the 1st embodiment, when a focal length of the second lens element 120 is f2, and a focal length of the fourth lens element 140 is f4, the following condition is satisfied: f4/f2=1.20.

In the optical photographing lens assembly according to the 1st embodiment, when an axial distance between the aperture stop 100 and the image-side surface 172 of the seventh lens element 170 is SD, and an axial distance between the object-side surface 111 of the first lens element 110 and the image-side surface 172 of the seventh lens element 170 is TD, the following condition is satisfied: TD/SD=1.40.

In the optical photographing lens assembly according to the 1st embodiment, when the curvature radius of the image-side surface 172 of the seventh lens element 170 is R14, a maximum effective radius of the object-side surface 111 of the first lens element 110 is Y11, and a maximum effective radius of the image-side surface 172 of the seventh lens element 170 is Y72, the following conditions are satisfied: R14/Y72=0.28; and Y11/Y72=0.90.

Figure 17:
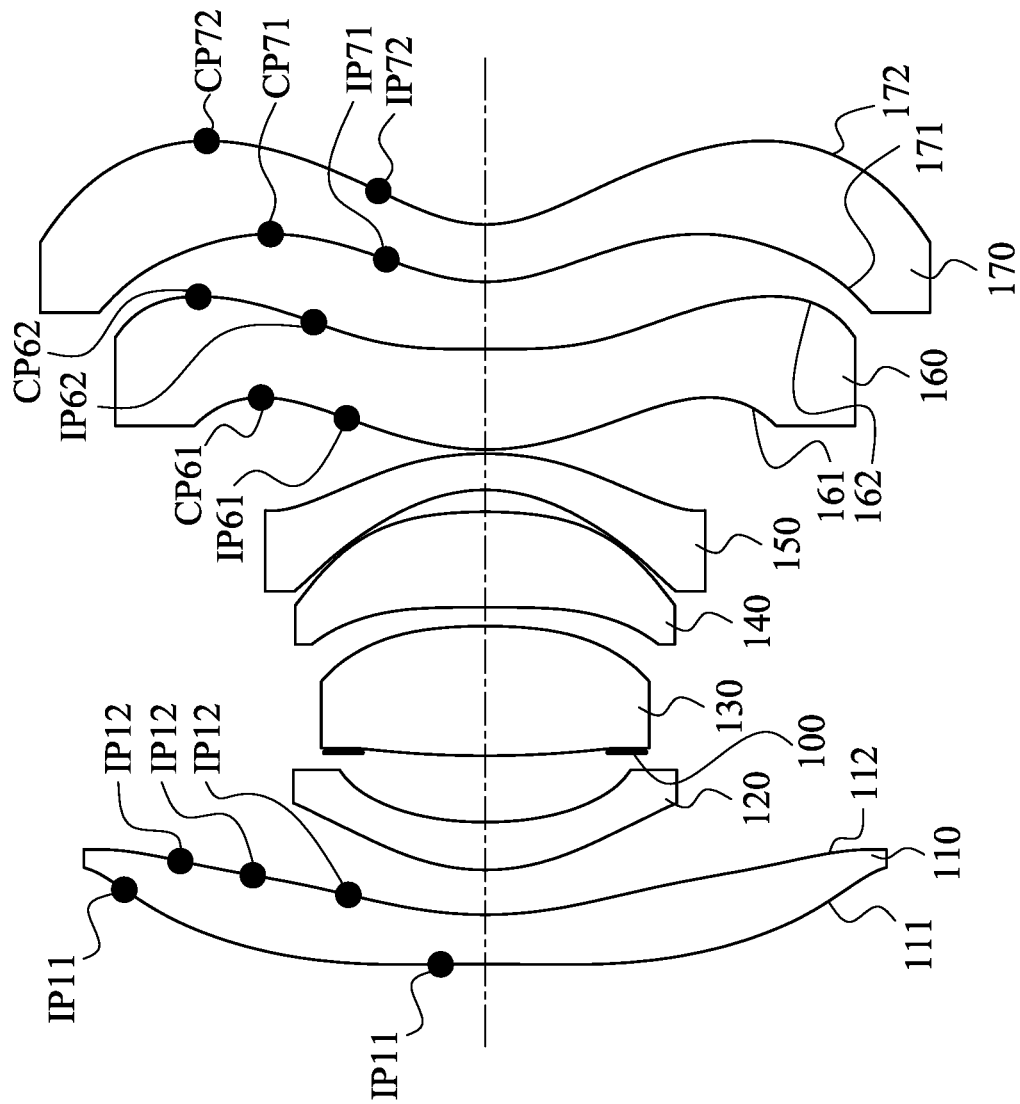
FIG. 17 is a schematic view of inflection points and critical points on the surfaces of the lens elements of the optical photographing lens assembly according to the 1st embodiment of the present disclosure.
Figure 18:
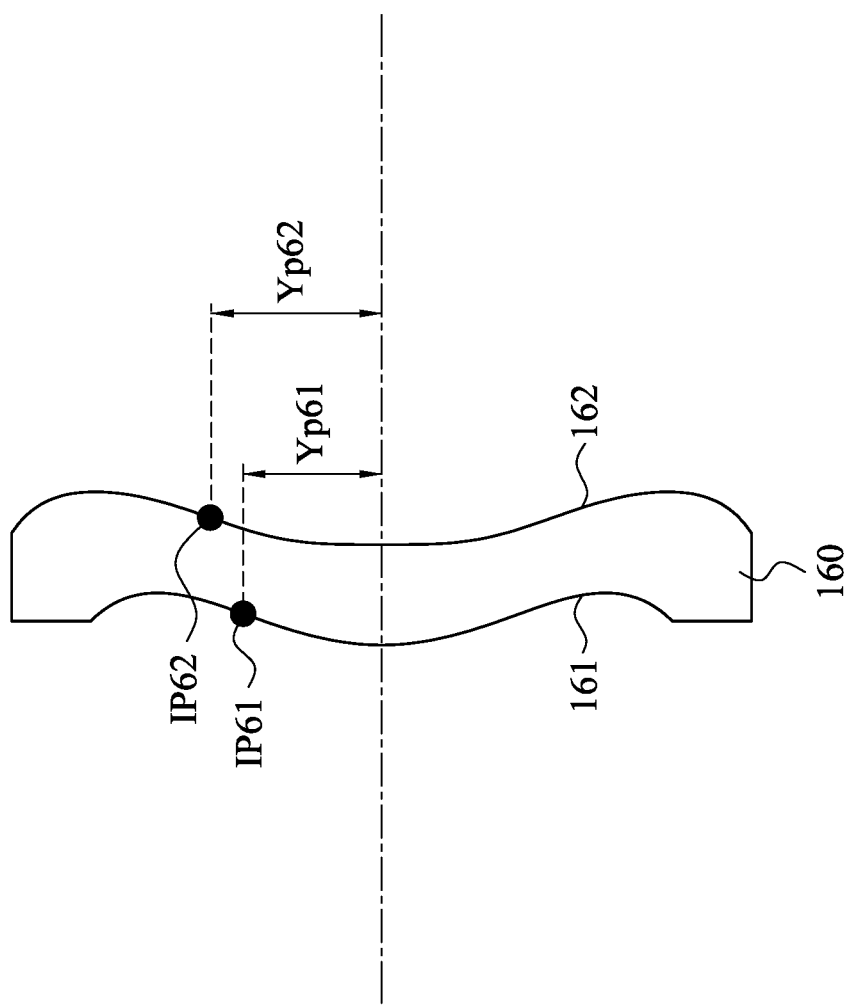
FIG. 18 is a schematic view of parameters Yp61 and Yp62 of the optical photographing lens assembly according to the 1st embodiment of the present disclosure.

FIG. 17 is a schematic view of inflection points and critical points on the surfaces of the lens elements of the optical photographing lens assembly according to the 1st embodiment of the present disclosure. FIG. 18 is a schematic view of parameters Yp61 and Yp62 of the optical photographing lens assembly according to the 1st embodiment of the present disclosure. In FIG. 17 and FIG. 18, when a distance perpendicular to an optical axis between an inflection point IP61 on the object-side surface 161 of the sixth lens element 160 closest to the optical axis and the optical axis is Yp61, a distance perpendicular to the optical axis between an inflection point IP62 on the image-side surface 162 of the sixth lens element 160 closest to the optical axis and the optical axis is Yp62, and the focal length of the optical photographing lens assembly is f, the following condition are satisfied: Yp61/f=0.36; and Yp62/f=0.44.

The detailed optical data of the 1st embodiment are shown in Table 1 and the aspheric surface data are shown in Table 2 below.

TABLE 1

1st Embodiment
f = 2.36 mm, Fno = 1.70, HFOV = 53.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −16.974 | ASP | 0.300 | Plastic | 1.511 | 56.8 | −4.13 |
| 2 | | 2.424 | ASP | 0.272 | | | | |
| 3 | Lens 2 | 1.258 | ASP | 0.290 | Plastic | 1.566 | 37.4 | 4.71 |
| 4 | | 2.182 | ASP | 0.423 | | | | |
| 5 | Ape. Stop | Plano | | −0.020 | | | | |
| 6 | Lens 3 | 6.697 | ASP | 0.787 | Plastic | 1.544 | 55.9 | 4.32 |
| 7 | | −3.464 | ASP | 0.114 | | | | |
| 8 | Lens 4 | −54.776 | ASP | 0.581 | Plastic | 1.544 | 55.9 | 5.68 |
| 9 | | −2.933 | ASP | 0.133 | | | | |
| 10 | Lens 5 | −0.971 | ASP | 0.220 | Plastic | 1.669 | 19.5 | −3.21 |
| 11 | | −1.935 | ASP | 0.025 | | | | |
| 12 | Lens 6 | 1.474 | ASP | 0.610 | Plastic | 1.544 | 55.9 | 2.78 |
| 13 | | 47.915 | ASP | 0.409 | | | | |
| 14 | Lens 7 | 1.025 | ASP | 0.348 | Plastic | 1.607 | 26.6 | −10.07 |
| 15 | | 0.766 | ASP | 0.602 | | | | |

TABLE 1-continued

1st Embodiment
f = 2.36 mm, Fno = 1.70, HFOV = 53.5 deg.

| Surface # | | Curvature Radius | Thickness | Material | Index | Abbe # | Focal Length |
|---|---|---|---|---|---|---|---|
| 16 | Filter | Plano | 0.180 | Glass | 1.517 | 64.2 | — |
| 17 | | Plano | 0.229 | | | | |
| 18 | Image | Plano | — | | | | |

Reference wavelength is 587.6 nm (d-line).

TABLE 2

Aspheric Coefficients

| | Surface # | | | | |
|---|---|---|---|---|---|
| | 1 | 2 | 3 | 4 | 6 |
| k = | −5.0000E+01 | −1.2477E+00 | −9.8688E−01 | −3.2633E+00 | 1.7574E+01 |
| A4 = | 7.6555E−02 | −2.7541E−02 | −2.0557E−03 | 2.4531E−01 | 7.4093E−03 |
| A6 = | −3.9397E−02 | −3.7648E−02 | −1.7625E−01 | −5.0315E−01 | −3.8738E−02 |
| A8 = | 1.8155E−02 | 2.7666E−02 | 5.7755E−01 | 2.2602E+00 | 7.0073E−02 |
| A10 = | −6.0373E−03 | −8.3070E−03 | −1.4481E+00 | −6.1009E+00 | −7.7479E−02 |
| A12 = | 1.2525E−03 | 1.3078E−03 | 1.7539E+00 | 9.5301E+00 | −8.8165E−03 |
| A14 = | −1.3802E−04 | −1.0718E−04 | −9.7972E−01 | −7.8513E+00 | |
| A16 = | 6.0166E−06 | 3.6141E−06 | 2.0571E−01 | 2.9183E+00 | |

| | Surface # | | | | |
|---|---|---|---|---|---|
| | 7 | 8 | 9 | 10 | 11 |
| k = | −8.9911E+01 | 7.2894E+01 | −1.3456E+00 | −1.9299E+00 | −5.5112E−01 |
| A4 = | −4.4760E−01 | −2.3304E−01 | −2.2934E−01 | −7.8246E−02 | −1.7024E−01 |
| A6 = | 5.2664E−01 | 6.7585E−02 | −5.2310E−03 | −2.7391E−02 | 2.2726E−01 |
| A8 = | −7.1410E−01 | −9.6790E−02 | 1.2297E−01 | 3.7173E−01 | 1.0139E−01 |
| A10 = | 5.9340E−01 | 1.8498E−01 | −3.0852E−01 | −5.7213E−01 | −3.6670E−01 |
| A12 = | −2.2753E−01 | 3.6900E−02 | 4.1684E−01 | 2.7004E−01 | 2.9458E−01 |
| A14 = | | −2.6941E−01 | −2.8666E−01 | 1.9379E−02 | −1.0186E−01 |
| A16 = | | 1.3232E−01 | 7.9155E−02 | −2.9134E−02 | 1.3220E−02 |

| | Surface # | | | |
|---|---|---|---|---|
| | 12 | 13 | 14 | 15 |
| k = | −5.8834E+00 | −9.0000E+01 | −1.5610E+00 | −2.1829E+00 |
| A4 = | 1.9562E−02 | 3.2411E−01 | −2.8949E−01 | −2.1720E−01 |
| A6 = | 2.9550E−02 | −2.7916E−01 | 1.6953E−01 | 1.6316E−01 |
| A8 = | −8.5240E−02 | 1.2248E−01 | −8.6011E−02 | −9.4168E−02 |
| A10 = | 5.5252E−02 | −3.2681E−02 | 3.7026E−02 | 3.8661E−02 |
| A12 = | −1.7459E−02 | 5.3020E−03 | −1.3159E−02 | −1.0914E−02 |
| A14 = | 2.7363E−03 | −4.8278E−04 | 3.4910E−03 | 2.0321E−03 |
| A16 = | −1.6984E−04 | 1.8633E−05 | −6.0351E−04 | −2.3593E−04 |
| A18 = | | | 5.8479E−05 | 1.5383E−05 |
| A20 = | | | −2.3793E−06 | −4.2871E−07 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
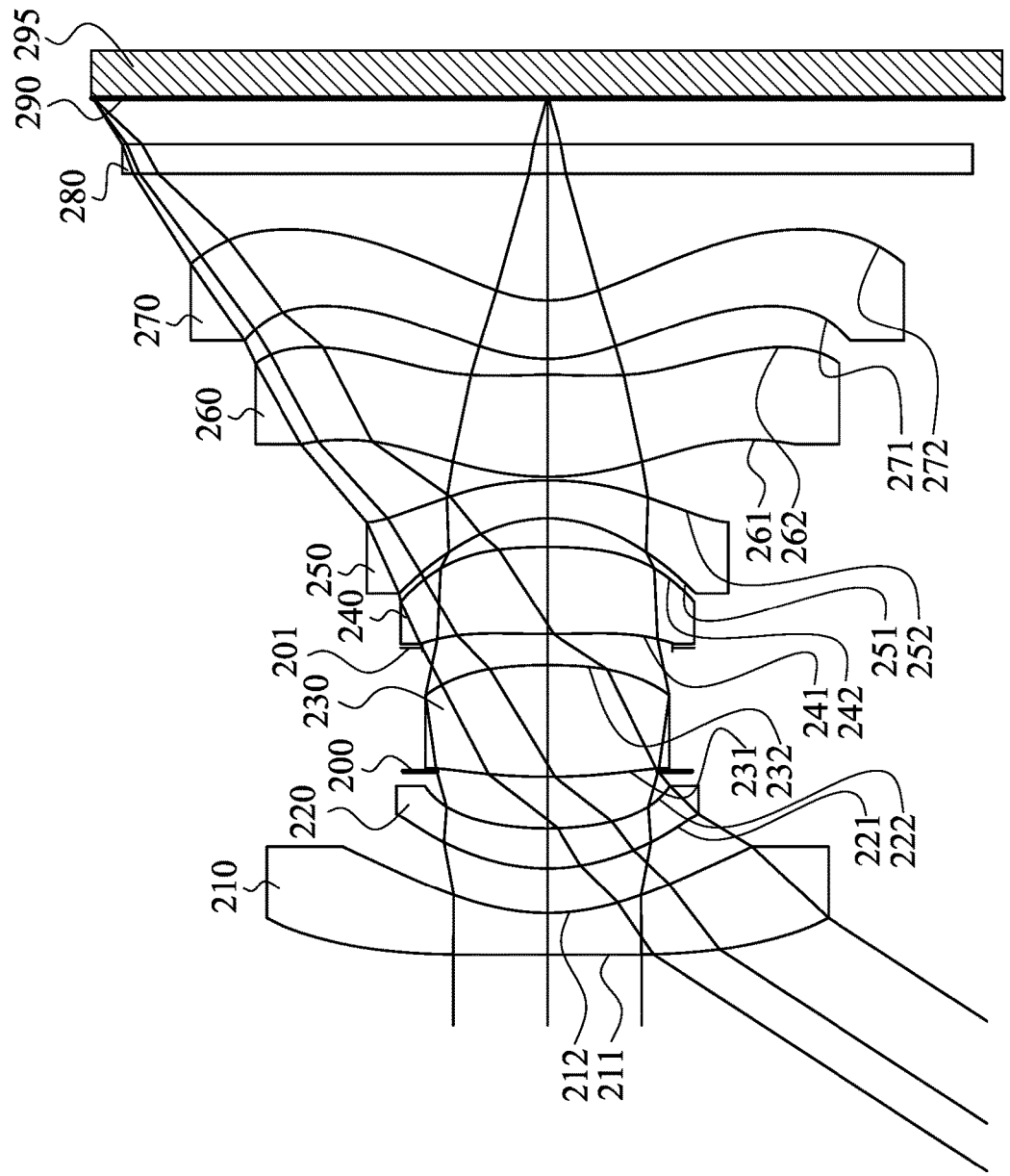
FIG. 3 is a schematic view of an imaging apparatus according to the 2nd embodiment of the present disclosure.
Figure 4:
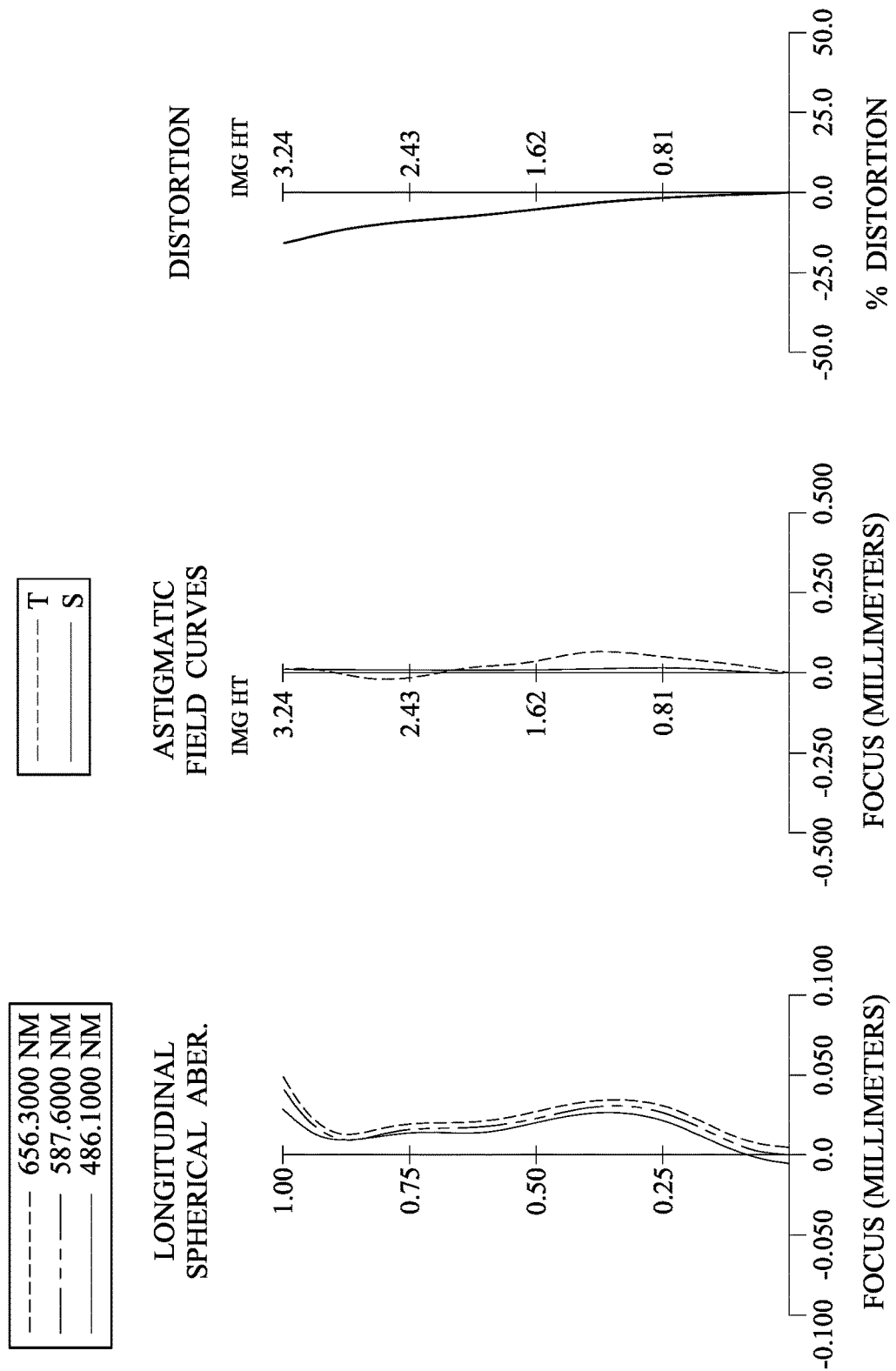
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an optical photographing lens assembly (its reference numeral is omitted) and an image sensor 295. The optical photographing lens assembly includes, in order from an object side to an image side, a first lens element 210, a second lens element 220, an aperture stop 200, a third lens element 230, a fourth lens element 240, a fifth lens element 250, a sixth lens element 260, a seventh lens element 270, a filter 280 and an image surface 290, wherein the image sensor 295 is disposed on the image surface 290 of the optical photographing lens assembly. The optical photographing lens assembly includes seventh lens elements (210, 220, 230, 240, 250, 260, 270) with air gaps between all adjacent lens elements, and without additional one or more lens elements inserted between the first lens element 210 and the seventh lens element 270.

The first lens element 210 with negative refractive power has an object-side surface 211 being concave in a paraxial region thereof and an image-side surface 212 being concave in a paraxial region thereof. The first lens element 210 is made of a plastic material, and has the object-side surface 211 and the image-side surface 212 being both aspheric. Furthermore, the object-side surface 211 of the first lens element 210 includes at least one inflection point.

The second lens element 220 with positive refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with positive refractive power has an object-side surface 261 being convex in a paraxial region thereof and an image-side surface 262 being convex in a paraxial region thereof. The sixth lens element 260 is made of a plastic material, and has the object-side surface 261 and the image-side surface 262 being both aspheric. Furthermore, each of the object-side surface 261 and the image-side surface 262 of the sixth lens element 260 includes at least one inflection point.

The seventh lens element 270 with negative refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Furthermore, each of the object-side surface 271 and the image-side surface 272 of the seventh lens element 270 includes at least one inflection point.

The filter 280 is made of a glass material and located between the seventh lens element 270 and the image surface 290, and will not affect the focal length of the optical photographing lens assembly.

The detailed optical data of the 2nd embodiment are shown in Table 3 and the aspheric surface data are shown in Table 4 below.

TABLE 3

2nd Embodiment
f = 2.47 mm, Fno = 1.84, HFOV= 57.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −100.000 | ASP | 0.300 | Plastic | 1.515 | 56.4 | −3.06 |
| 2 | | 1.603 | ASP | 0.319 | | | | |
| 3 | Lens 2 | 1.414 | ASP | 0.285 | Plastic | 1.566 | 37.4 | 5.51 |
| 4 | | 2.400 | ASP | 0.407 | | | | |
| 5 | Ape. Stop | Plano | | −0.040 | | | | |
| 6 | Lens 3 | 4.243 | ASP | 0.794 | Plastic | 1.544 | 56.0 | 3.73 |
| 7 | | −3.627 | ASP | 0.122 | | | | |
| 8 | Stop | Plano | | 0.100 | | | | |
| 9 | Lens 4 | 8.110 | ASP | 0.621 | Plastic | 1.544 | 56.0 | 4.95 |
| 10 | | −3.920 | ASP | 0.204 | | | | |
| 11 | Lens 5 | −1.009 | ASP | 0.270 | Plastic | 1.660 | 20.4 | −2.76 |
| 12 | | −2.503 | ASP | 0.025 | | | | |
| 13 | Lens 6 | 1.890 | ASP | 0.727 | Plastic | 1.544 | 56.0 | 2.66 |
| 14 | | −5.303 | ASP | 0.113 | | | | |
| 15 | Lens 7 | 1.120 | ASP | 0.419 | Plastic | 1.660 | 20.4 | −11.15 |
| 16 | | 0.827 | ASP | 0.900 | | | | |
| 17 | Filter | Plano | | 0.210 | Glass | 1.517 | 64.2 | — |
| 18 | | Plano | | 0.327 | | | | |
| 19 | Image | Plano | | — | | | | |

Reference wavelength is 587.6 nm (d-line).
Effective radius of the stop on Surface 8 is 0.890 mm.

TABLE 4

Aspheric Coefficients

| Surface # | | | | |
|---|---|---|---|---|
| 1 | 2 | 3 | 4 | 6 |
| k = −9.9000E+01 | −1.2324E+00 | −2.7915E−01 | −2.5497E+00 | −3.7461E+00 |
| A4 = 1.3910E−02 | −6.9754E−02 | −5.1511E−02 | 1.5586E−01 | −6.9829E−03 |

TABLE 4-continued

| Aspheric Coefficients | | | | | |
|---|---|---|---|---|---|
| A6 = | 1.7506E−02 | 5.0992E−02 | −2.0620E−02 | −1.2512E−01 | −5.4802E−02 |
| A8 = | −1.6030E−02 | −3.2374E−02 | 7.7832E−03 | 5.5293E−01 | 7.6638E−02 |
| A10 = | 7.1646E−03 | 9.6391E−03 | 8.7350E−02 | −6.4584E−01 | −6.7546E−02 |
| A12 = | −1.8176E−03 | −9.7594E−04 | −7.1831E−02 | 4.9997E−01 | −1.0870E−02 |
| A14 = | 2.4789E−04 | | | | |
| A16 = | −1.3865E−05 | | | | |

| | Surface # | | | | |
|---|---|---|---|---|---|
| | 7 | 9 | 10 | 11 | 12 |
| k = | −9.9000E+01 | 3.2603E+01 | −7.0108E−01 | −1.7810E+00 | 6.2636E−01 |
| A4 = | −4.4556E−01 | −2.5447E−01 | −2.1551E−01 | −8.5638E−02 | −1.6734E−01 |
| A6 = | 5.3468E−01 | 1.6196E−01 | −8.8441E−02 | 1.3075E−02 | 2.2897E−01 |
| A8 = | −7.3277E−01 | −3.6869E−01 | 1.4181E−01 | 2.1155E−01 | 7.6470E−02 |
| A10 = | 5.8071E−01 | 6.4488E−01 | −7.5129E−02 | −3.3137E−01 | −3.3953E−01 |
| A12 = | −2.1085E−01 | −4.7219E−01 | 9.2532E−02 | 9.3323E−02 | 2.7562E−01 |
| A14 = | | 6.1502E−02 | −1.1327E−01 | 8.1293E−02 | −9.3694E−02 |
| A16 = | | 4.2307E−02 | 4.4756E−02 | −3.6064E−02 | 1.1793E−02 |

| | Surface # | | | |
|---|---|---|---|---|
| | 13 | 14 | 15 | 16 |
| k = | −6.7919E+00 | −3.5617E+01 | −1.3192E+00 | −3.3759E+00 |
| A4 = | 2.6935E−02 | 3.4609E−01 | −2.6598E−01 | −1.0816E−01 |
| A6 = | −2.2884E−02 | −2.9163E−01 | 1.8325E−01 | 7.8071E−02 |
| A8 = | −1.5480E−02 | 1.2922E−01 | −9.4860E−02 | −4.2436E−02 |
| A10 = | 1.2739E−02 | −3.4866E−02 | 3.1575E−02 | 1.4422E−02 |
| A12 = | −3.2222E−03 | 5.6632E−03 | −6.9583E−03 | −3.0238E−03 |
| A14 = | 3.3442E−04 | −5.1117E−04 | 1.2273E−03 | 3.8801E−04 |
| A16 = | −1.1483E−05 | 1.9488E−05 | −2.0461E−04 | −2.9661E−05 |
| A18 = | | | 2.4417E−05 | 1.2457E−06 |
| A20 = | | | −1.2596E−06 | −2.2280E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.47 | TL/ImgH | 1.88 |
| Fno | 1.84 | (f + TL)/ImgH | 2.65 |
| HFOV [deg.] | 57.0 | BL/ImgH | 0.44 |
| 1/|tan(HFOV)| | 0.65 | BL/f | 0.58 |
| Nmax | 1.660 | f/EPD | 1.84 |
| V7 | 20.4 | f/f3 | 0.66 |
| V2 + V5 + V7 | 78.2 | |f1/f7| | 0.27 |
| CT7/CT2 | 1.47 | f4/f2 | 0.90 |
| CT7/CT6 | 0.58 | TD/SD | 1.39 |
| ΣAT/ΣCT | 0.37 | R14/Y72 | 0.33 |
| (R3 + R4)/(R3 − R4) | −3.87 | Y11/Y72 | 0.79 |
| (R5 + R6)/(R5 − R6) | 0.08 | Yp61/f | 0.33 |
| (R9 + R10)/(R9 − R10) | −2.35 | Yp62/f | 0.09 |
| (R13 − R14)/(R13 + R14) | 0.15 | | |

3rd Embodiment

Figure 5:
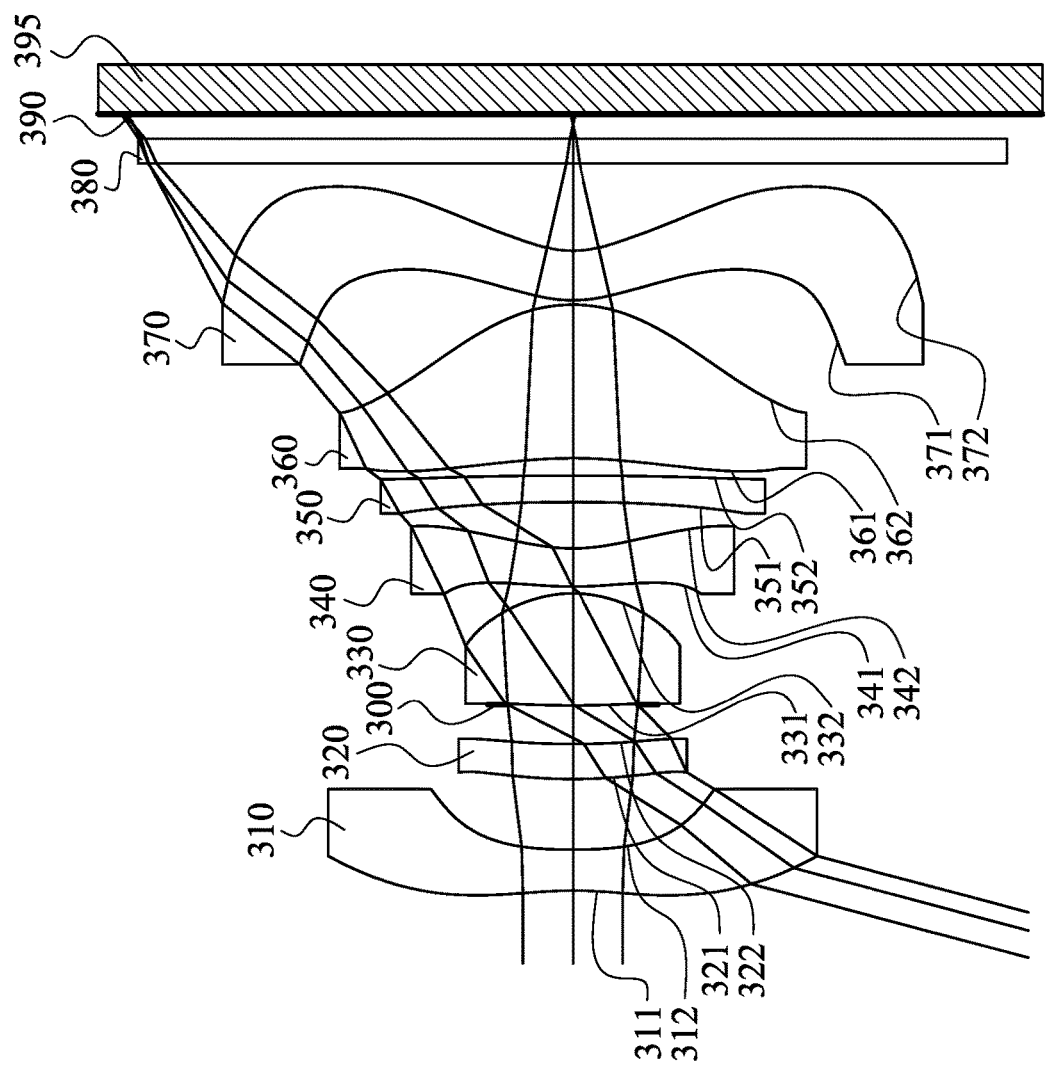
FIG. 5 is a schematic view of an imaging apparatus according to the 3rd embodiment of the present disclosure.
Figure 6:
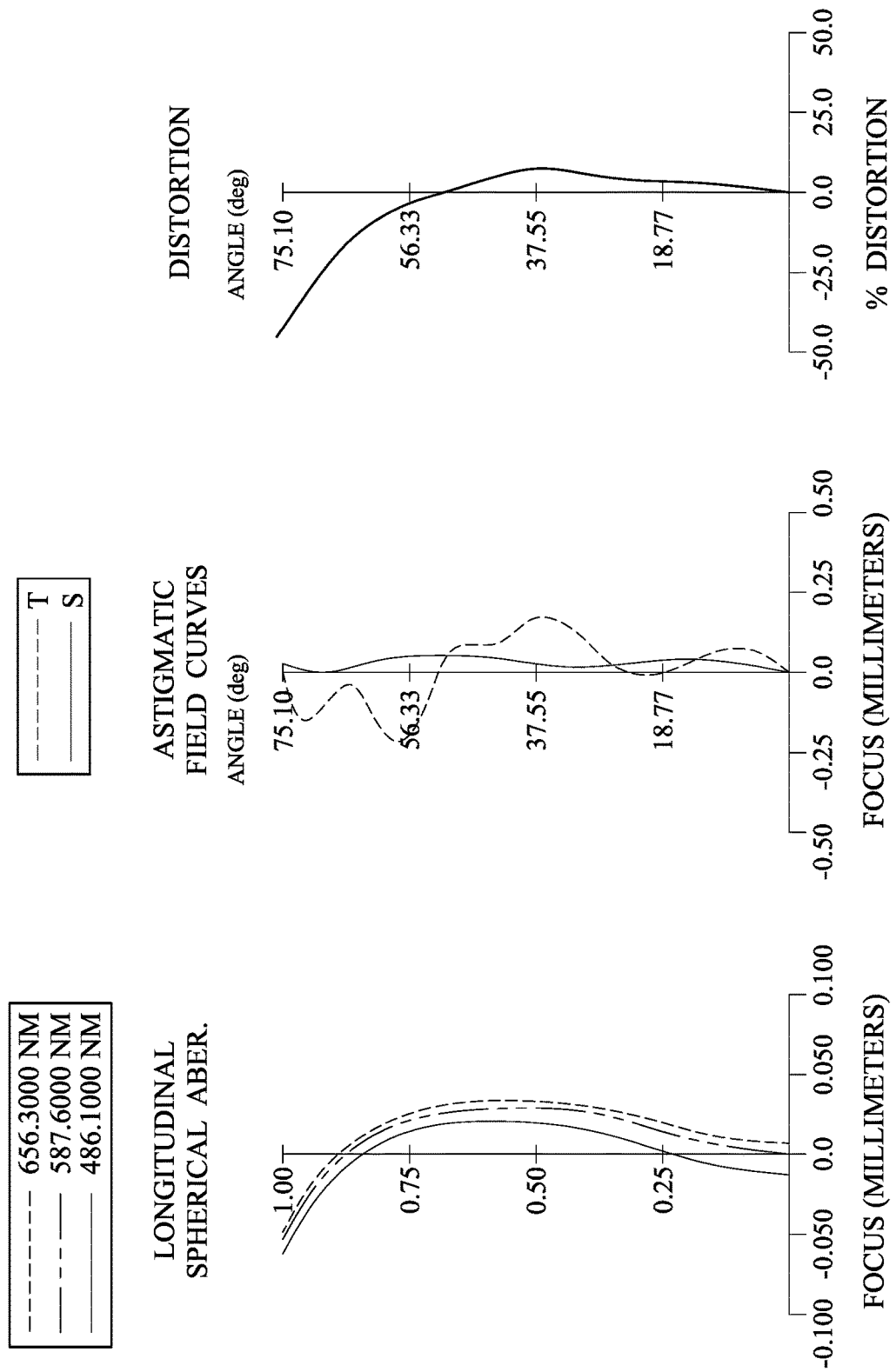
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an optical photographing lens assembly (its reference numeral is omitted) and an image sensor 395. The optical photographing lens assembly includes, in order from an object side to an image side, a first lens element 310, a second lens element 320, an aperture stop 300, a third lens element 330, a fourth lens element 340, a fifth lens element 350, a sixth lens element 360, a seventh lens element 370, a filter 380 and an image surface 390, wherein the image sensor 395 is disposed on the image surface 390 of the optical photographing lens assembly. The optical photographing lens assembly includes seventh lens elements (310, 320, 330, 340, 350, 360, 370) with air gaps between all adjacent lens elements, and without additional one or more lens elements inserted between the first lens element 310 and the seventh lens element 370.

The first lens element 310 with negative refractive power has an object-side surface 311 being concave in a paraxial region thereof and an image-side surface 312 being concave in a paraxial region thereof. The first lens element 310 is made of a plastic material, and has the object-side surface 311 and the image-side surface 312 being both aspheric. Furthermore, each of the object-side surface 311 and the image-side surface 312 of the first lens element 310 includes at least one inflection point.

The second lens element 320 with positive refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with positive refractive power has an object-side surface 361 being concave in a paraxial region thereof and an image-side surface 362 being convex in a paraxial region thereof. The sixth lens element 360 is made of a plastic material, and has the object-side surface 361 and the image-side surface 362 being both aspheric. Furthermore, each of the object-side surface 361 and the image-side surface 362 of the sixth lens element 360 includes at least one inflection point.

The seventh lens element 370 with negative refractive power has an object-side surface 371 being convex in a paraxial region thereof and an image-side surface 372 being concave in a paraxial region thereof. The seventh lens element 370 is made of a plastic material, and has the object-side surface 371 and the image-side surface 372 being both aspheric. Furthermore, each of the object-side surface 371 and the image-side surface 372 of the seventh lens element 370 includes at least one inflection point.

The filter 380 is made of a glass material and located between the seventh lens element 370 and the image surface 390, and will not affect the focal length of the optical photographing lens assembly.

The detailed optical data of the 3rd embodiment are shown in Table 5 and the aspheric surface data are shown in Table 6 below.

TABLE 5

3rd Embodiment
f = 1.49 mm, Fno = 2.16, HFOV = 75.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.532 | ASP | 0.280 | Plastic | 1.545 | 56.1 | −2.79 |
| 2 | | 3.964 | ASP | 0.485 | | | | |
| 3 | Lens 2 | 3.418 | ASP | 0.240 | Plastic | 1.688 | 18.7 | 12.03 |
| 4 | | 5.656 | ASP | 0.271 | | | | |
| 5 | Ape. Stop | Plano | | −0.005 | | | | |
| 6 | Lens 3 | 6.799 | ASP | 0.773 | Plastic | 1.545 | 56.1 | 1.51 |
| 7 | | −0.901 | ASP | 0.046 | | | | |
| 8 | Lens 4 | 2.473 | ASP | 0.263 | Plastic | 1.688 | 18.7 | −3.97 |
| 9 | | 1.242 | ASP | 0.318 | | | | |
| 10 | Lens 5 | −11.417 | ASP | 0.180 | Plastic | 1.650 | 21.5 | −26.91 |
| 11 | | −33.034 | ASP | 0.120 | | | | |
| 12 | Lens 6 | −3.051 | ASP | 1.057 | Plastic | 1.535 | 56.3 | 2.59 |
| 13 | | −1.069 | ASP | 0.030 | | | | |
| 14 | Lens 7 | 0.884 | ASP | 0.340 | Plastic | 1.688 | 18.7 | −13.81 |
| 15 | | 0.682 | ASP | 0.600 | | | | |
| 16 | Filter | Plano | | 0.170 | Glass | 1.517 | 64.2 | — |
| 17 | | Plano | | 0.174 | | | | |
| 18 | Image | Plano | | — | | | | |

Reference wavelength is 587.6 nm (d-line).

TABLE 6

Aspheric Coefficients

| | Surface # | | | | |
|---|---|---|---|---|---|
| | 1 | 2 | 3 | 4 | 6 |
| k = | 4.4250E−01 | −1.5882E+01 | −2.0961E+01 | −9.0000E+01 | 4.9165E+01 |
| A4 = | 4.2472E−01 | 7.9160E−01 | −3.4890E−02 | 7.6972E−02 | −5.1265E−02 |
| A6 = | −4.3171E−01 | 3.8440E+00 | 2.2964E−02 | 1.6676E−02 | −1.6269E−01 |
| A8 = | 3.3503E−01 | −2.5385E+01 | −6.2871E−01 | −4.1270E−01 | −3.1925E−01 |
| A10 = | −1.6798E−01 | 7.6648E+01 | 2.4723E−01 | 1.6330E−01 | −3.1666E−01 |
| A12 = | 5.1301E−02 | −1.1265E+02 | | | |
| A14 = | −8.6517E−03 | 7.7140E+01 | | | |
| A16 = | 6.1921E−04 | −1.9903E+01 | | | |

| | Surface # | | | | |
|---|---|---|---|---|---|
| | 7 | 8 | 9 | 10 | 11 |
| k = | −2.7184E−01 | −2.1974E+00 | −2.7049E+00 | 4.8378E+01 | −8.3752E+00 |
| A4 = | 6.4107E−02 | −6.1007E−01 | −5.3977E−01 | 2.8978E−02 | 2.4993E−02 |
| A6 = | −6.9035E−01 | 1.0217E+00 | 1.0664E+00 | −3.1729E−01 | −2.0490E−01 |

TABLE 6-continued

| Aspheric Coefficients | | | | |
|---|---|---|---|---|
| A8 = | 1.0745E+01 | 9.3496E−01 | −1.5669E+00 | 1.1545E+00 | 5.9113E−01 |
| A10 = | −6.1170E+01 | −1.1952E+01 | 1.5284E+00 | −2.0417E+00 | −8.4813E−01 |
| A12 = | 1.6866E+02 | 2.8878E+01 | −9.5101E−01 | 1.8867E+00 | 6.4387E−01 |
| A14 = | −2.3421E+02 | −3.0955E+01 | 3.3915E−01 | −8.7378E−01 | −2.4653E−01 |
| A16 = | 1.2877E+02 | 1.2581E+01 | −5.2870E−02 | 1.5985E−01 | 3.7474E−02 |

| | Surface # | | | |
|---|---|---|---|---|
| | 12 | 13 | 14 | 15 |
| k = | 2.2059E+00 | −1.0881E+00 | −6.8183E+00 | −4.8151E+00 |
| A4 = | 2.4939E−01 | −8.5741E−02 | −2.0310E+00 | −1.3758E−01 |
| A6 = | −4.9548E−01 | 2.1824E−01 | −8.0735E−01 | 2.2528E−01 |
| A8 = | 7.1409E−01 | −1.8317E−01 | 3.9622E+01 | −1.9335E−01 |
| A10 = | −5.8007E−01 | 1.1891E−01 | −1.9825E+02 | 8.3681E−02 |
| A12 = | 2.6721E−01 | −5.2764E−02 | 4.4433E+02 | −1.9266E−02 |
| A14 = | −6.4968E−02 | 1.2731E−02 | −4.7054E+02 | 2.2568E−03 |
| A16 = | 6.5055E−03 | −1.2066E−03 | 1.8831E+02 | −1.0625E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.49 | TL/ImgH | 1.72 |
| Fno | 2.16 | (f + TL)/ImgH | 2.20 |
| HFOV [deg.] | 75.1 | BL/ImgH | 0.30 |
| 1/|tan(HFOV)| | 0.27 | BL/f | 0.63 |
| Nmax | 1.688 | f/EPD | 2.16 |
| V7 | 18.7 | f/f3 | 0.98 |
| V2 + V5 + V7 | 58.9 | |f1/f7| | 0.20 |
| CT7/CT2 | 1.42 | f4/f2 | −0.33 |
| CT7/CT6 | 0.32 | TD/SD | 1.41 |
| ΣAT/ΣCT | 0.40 | R14/Y72 | 0.28 |
| (R3 + R4)/(R3 − R4) | −4.06 | Y11/Y72 | 0.70 |
| (R5 + R6)/(R5 − R6) | 0.77 | Yp61/f | 0.47 |
| (R9 + R10)/(R9 − R10) | −2.06 | Yp62/f | 0.63 |
| (R13 − R14)/(R13 + R14) | 0.13 | | |

4th Embodiment

Figure 7:
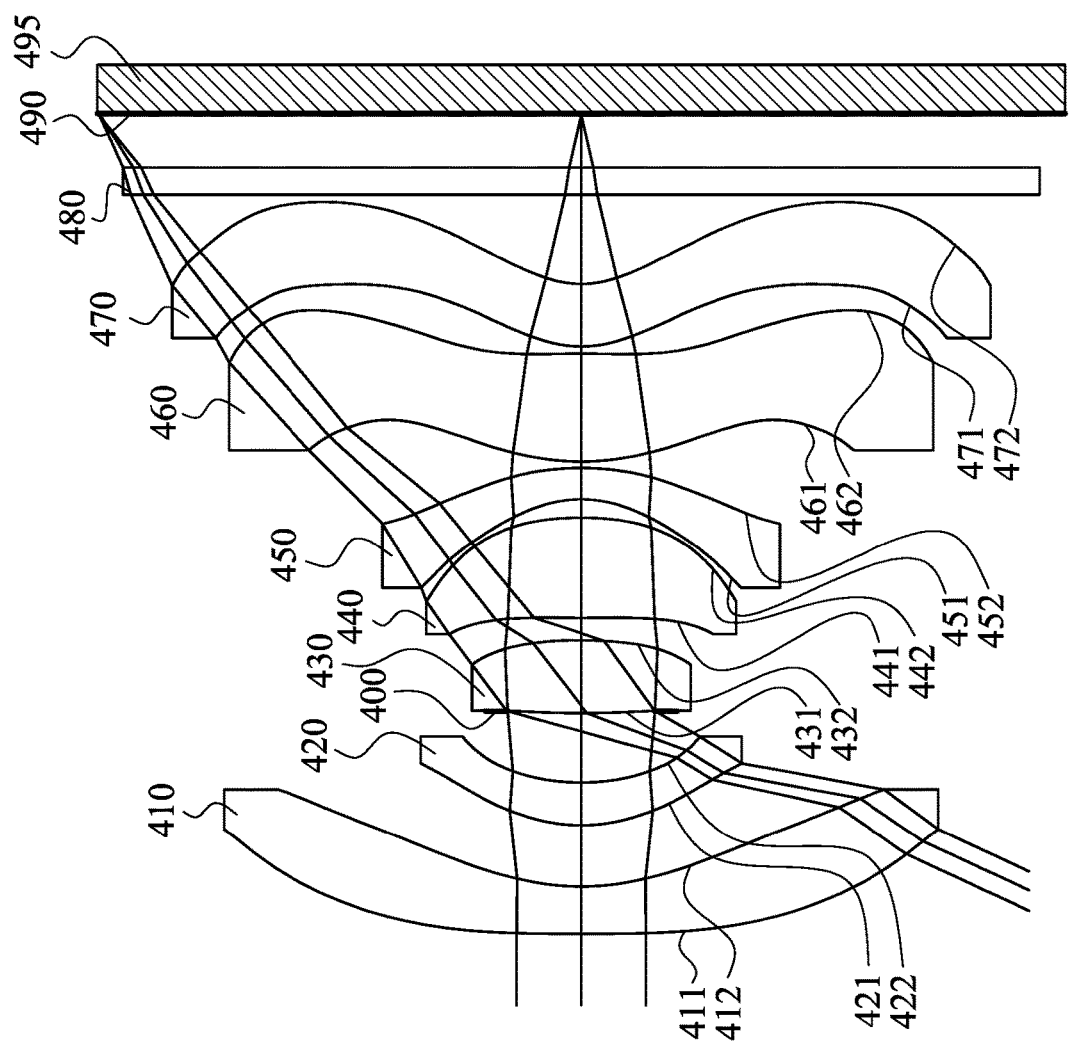
FIG. 7 is a schematic view of an imaging apparatus according to the 4th embodiment of the present disclosure.
Figure 8:
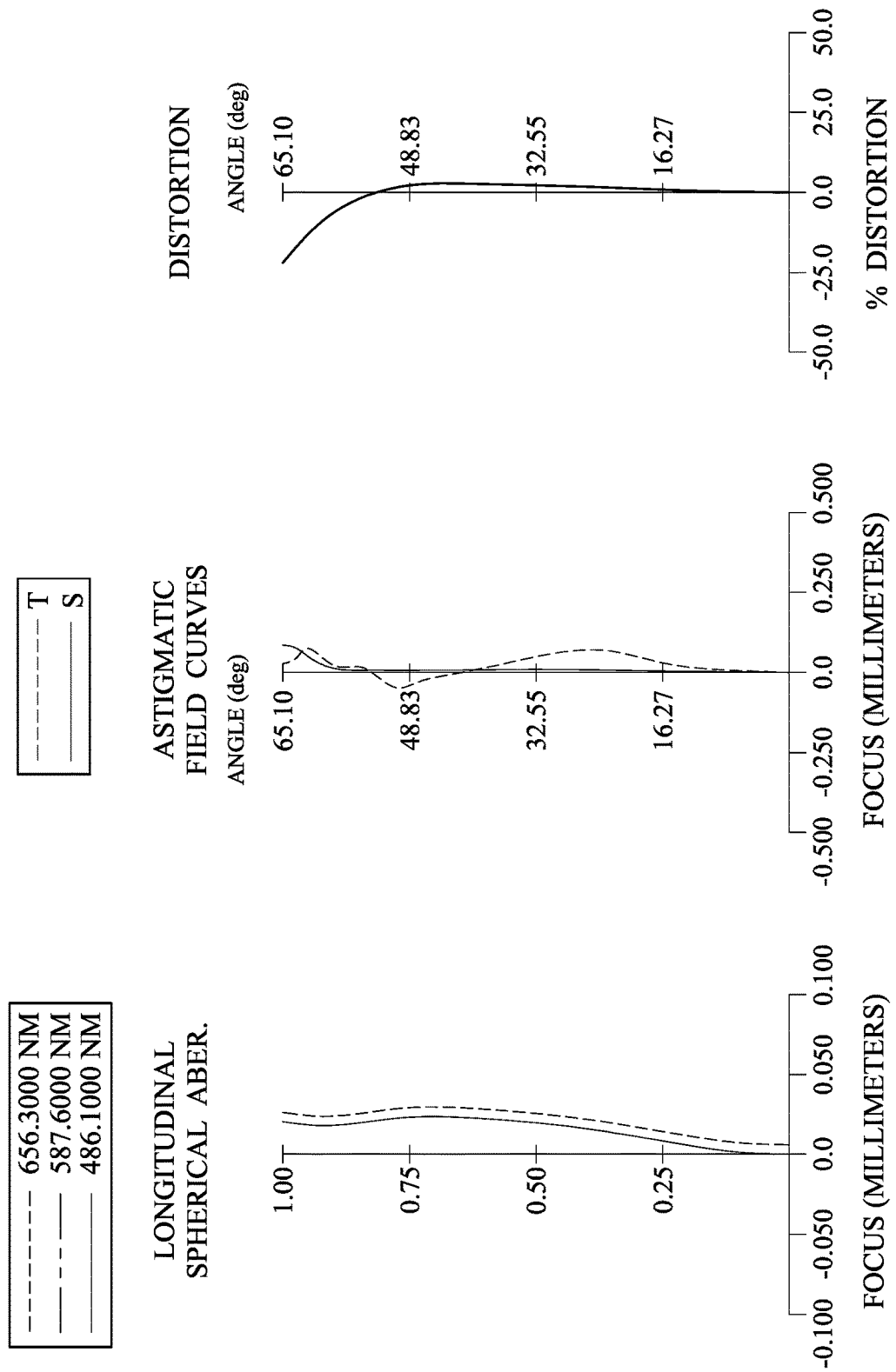
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an optical photographing lens assembly (its reference numeral is omitted) and an image sensor 495. The optical photographing lens assembly includes, in order from an object side to an image side, a first lens element 410, a second lens element 420, an aperture stop 400, a third lens element 430, a fourth lens element 440, a fifth lens element 450, a sixth lens element 460, a seventh lens element 470, a filter 480 and an image surface 490, wherein the image sensor 495 is disposed on the image surface 490 of the optical photographing lens assembly. The optical photographing lens assembly includes seventh lens elements (410, 420, 430, 440, 450, 460, 470) with air gaps between all adjacent lens elements, and without additional one or more lens elements inserted between the first lens element 410 and the seventh lens element 470.

The first lens element 410 with negative refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric. Furthermore, each of the object-side surface 411 and the image-side surface 412 of the first lens element 410 includes at least one inflection point.

The second lens element 420 with positive refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with positive refractive power has an object-side surface 461 being convex in a paraxial region thereof and an image-side surface 462 being convex in a paraxial region thereof. The sixth lens element 460 is made of a plastic material, and has the object-side surface 461 and the image-side surface 462 being both aspheric. Furthermore, each of the object-side surface 461 and the image-side surface 462 of the sixth lens element 460 includes at least one inflection point.

The seventh lens element 470 with positive refractive power has an object-side surface 471 being convex in a paraxial region thereof and an image-side surface 472 being concave in a paraxial region thereof. The seventh lens element 470 is made of a plastic material, and has the object-side surface 471 and the image-side surface 472 being both aspheric. Furthermore, each of the object-side surface 471 and the image-side surface 472 of the seventh lens element 470 includes at least one inflection point.

The filter 480 is made of a glass material and located between the seventh lens element 470 and the image surface 490, and will not affect the focal length of the optical photographing lens assembly.

The detailed optical data of the 4th embodiment are shown in Table 7 and the aspheric surface data are shown in Table 8 below.

TABLE 7

4th Embodiment
f = 1.99 mm, Fno = 2.20, HFOV = 65.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 25.747 | ASP | 0.330 | Plastic | 1.513 | 61.0 | −3.70 |
| 2 | | 1.762 | ASP | 0.431 | | | | |
| 3 | Lens 2 | 1.227 | ASP | 0.300 | Plastic | 1.566 | 37.4 | 6.62 |
| 4 | | 1.663 | ASP | 0.499 | | | | |
| 5 | Ape. Stop | Plano | | −0.015 | | | | |
| 6 | Lens 3 | 6.654 | ASP | 0.510 | Plastic | 1.544 | 55.9 | 4.13 |
| 7 | | −3.303 | ASP | 0.157 | | | | |
| 8 | Lens 4 | 16.116 | ASP | 0.702 | Plastic | 1.512 | 61.3 | 3.81 |
| 9 | | −2.182 | ASP | 0.129 | | | | |
| 10 | Lens 5 | −0.874 | ASP | 0.220 | Plastic | 1.669 | 19.5 | −2.43 |
| 11 | | −2.086 | ASP | 0.043 | | | | |
| 12 | Lens 6 | 1.731 | ASP | 0.755 | Plastic | 1.544 | 55.9 | 2.65 |
| 13 | | −7.304 | ASP | 0.051 | | | | |
| 14 | Lens 7 | 0.827 | ASP | 0.437 | Plastic | 1.535 | 56.3 | 38.93 |
| 15 | | 0.702 | ASP | 0.627 | | | | |
| 16 | Filter | Plano | | 0.190 | Glass | 1.517 | 64.2 | — |
| 17 | | Plano | | 0.378 | | | | |
| 18 | Image | Plano | | — | | | | |

Reference wavelength is 587.6 nm (d-line).

TABLE 8

Aspheric Coefficients

| Surface # | | | | |
|---|---|---|---|---|
| 1 | 2 | 3 | 4 | 6 |

| | 1 | 2 | 3 | 4 | 6 |
|---|---|---|---|---|---|
| k = | −6.0723E+00 | −1.1816E+00 | −7.8297E−01 | −1.2874E+00 | 2.1521E+01 |
| A4 = | 1.4437E+00 | −6.0909E−02 | −5.5605E−02 | 1.4940E−01 | −4.1561E−02 |
| A6 = | −1.9379E+00 | 3.4038E−02 | 2.1374E−01 | 4.2208E−01 | 7.7938E−02 |
| A8 = | 1.5658E+00 | −2.4069E−02 | −8.3022E−01 | −2.5424E+00 | −1.4036E+00 |
| A10 = | 1.2877E+00 | 9.8461E−03 | 1.7114E+00 | 8.4894E+00 | 5.8891E+00 |
| A12 = | −5.7383E+00 | −2.0782E−03 | −1.9975E+00 | −1.4309E+01 | −6.2548E+00 |
| A14 = | 6.8129E+00 | 2.1406E−04 | 1.1651E+00 | 1.1823E+01 | −2.9584E+01 |
| A16 = | −2.8094E+00 | −8.5101E−06 | −2.6270E−01 | −3.5032E+00 | 6.1949E+01 |

| Surface # | | | | |
|---|---|---|---|---|
| 7 | 8 | 9 | 10 | 11 |

| | 7 | 8 | 9 | 10 | 11 |
|---|---|---|---|---|---|
| k = | −3.9791E+01 | −1.4160E+01 | −1.8104E−02 | −1.9599E+00 | −1.4630E−01 |
| A4 = | −3.6109E−01 | −2.7478E−01 | −2.3030E−01 | −1.4542E−01 | −2.2472E−01 |
| A6 = | 1.0095E−01 | 4.7633E−01 | −1.1767E−01 | −1.6713E−01 | 3.8936E−01 |
| A8 = | 1.5960E+00 | −1.6284E+00 | 6.2970E−01 | 3.1447E+00 | 1.9930E−01 |
| A10 = | −9.6250E+00 | 3.3427E+00 | −1.2531E+00 | −9.9046E+00 | −1.2307E+00 |
| A12 = | 2.4919E+01 | −3.6630E+00 | 1.3604E+00 | 1.5710E+01 | 1.6718E+00 |
| A14 = | −3.1675E+01 | 1.9221E+00 | −8.1181E−01 | −1.4508E+01 | −1.2179E+00 |
| A16 = | 1.5530E+01 | −3.7447E−01 | 2.0443E−01 | 7.7699E+00 | 5.2428E−01 |
| A18 = | | | | −2.1768E+00 | −1.2634E−01 |
| A20 = | | | | 2.3498E−01 | 1.3160E−02 |

| Surface # | | | |
|---|---|---|---|
| 12 | 13 | 14 | 15 |

| | 12 | 13 | 14 | 15 |
|---|---|---|---|---|
| k = | −5.4747E+00 | −8.3814E+01 | −1.4963E+00 | −2.2861E+00 |
| A4 = | 4.9052E−02 | 3.1950E−01 | −1.1171E+01 | −1.3192E−01 |
| A6 = | −7.1094E−02 | −2.2846E−01 | 2.7298E+01 | 3.6811E−02 |

TABLE 8-continued

| Aspheric Coefficients | | | | |
|---|---|---|---|---|
| A8 = | 7.7174E−02 | 7.3358E−02 | −1.7440E+01 | 5.5068E−03 |
| A10 = | −1.0437E−01 | −6.6635E−03 | −1.1532E+02 | −8.9666E−03 |
| A12 = | 8.4084E−02 | −3.4001E−03 | 4.2502E+02 | 3.4327E−03 |
| A14 = | −3.9637E−02 | 1.4235E−03 | −6.8020E+02 | −6.8142E−04 |
| A16 = | 1.1021E−02 | −2.4939E−04 | 5.6508E+02 | 7.5167E−05 |
| A18 = | −1.6747E−03 | 2.2099E−05 | −2.2904E+02 | −4.3303E−06 |
| A20 = | 1.0691E−04 | −8.0910E−07 | 3.3531E+01 | 1.0076E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.99 | TL/ImgH | 1.70 |
| Fno | 2.20 | (f + TL)/ImgH | 2.30 |
| HFOV [deg.] | 65.1 | BL/ImgH | 0.35 |
| 1/|tan(HFOV)| | 0.46 | BL/f | 0.60 |
| Nmax | 1.669 | f/EPD | 2.20 |
| V7 | 56.3 | f/f3 | 0.48 |
| V2 + V5 + V7 | 113.2 | |f1/f7| | 0.10 |
| CT7/CT2 | 1.46 | f4/f2 | 0.57 |
| CT7/CT6 | 0.58 | TD/SD | 1.52 |
| ΣAT/ΣCT | 0.40 | R14/Y72 | 0.25 |
| (R3 + R4)/(R3 − R4) | −6.63 | Y11/Y72 | 0.87 |
| (R5 + R6)/(R5 − R6) | 0.34 | Yp61/f | 0.42 |
| (R9 + R10)/(R9 − R10) | −2.44 | Yp62/f | 0.10 |
| (R13 − R14)/(R13 + R14) | 0.08 | | |

5th Embodiment

Figure 9:
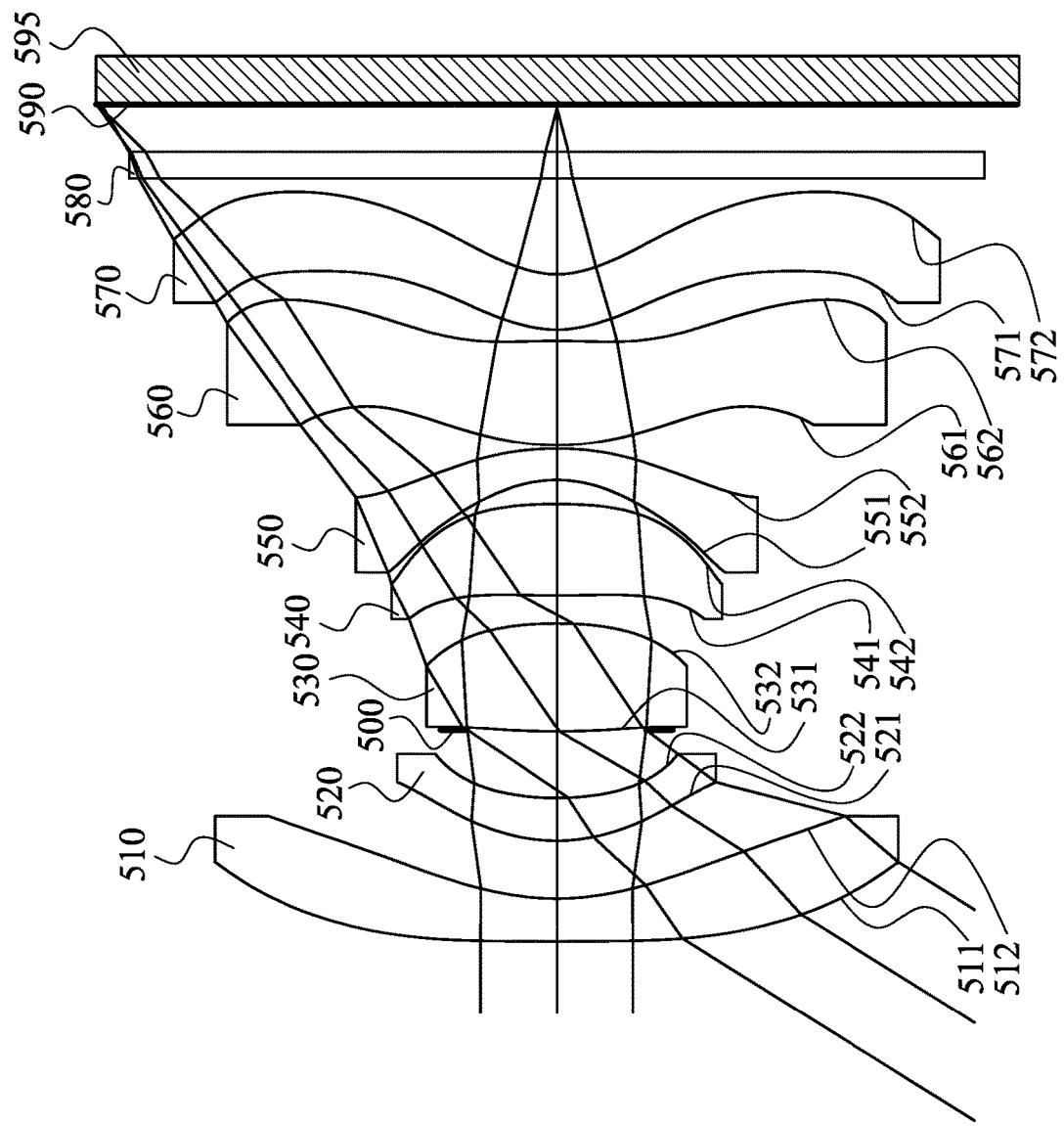
FIG. 9 is a schematic view of an imaging apparatus according to the 5th embodiment of the present disclosure.
Figure 10:
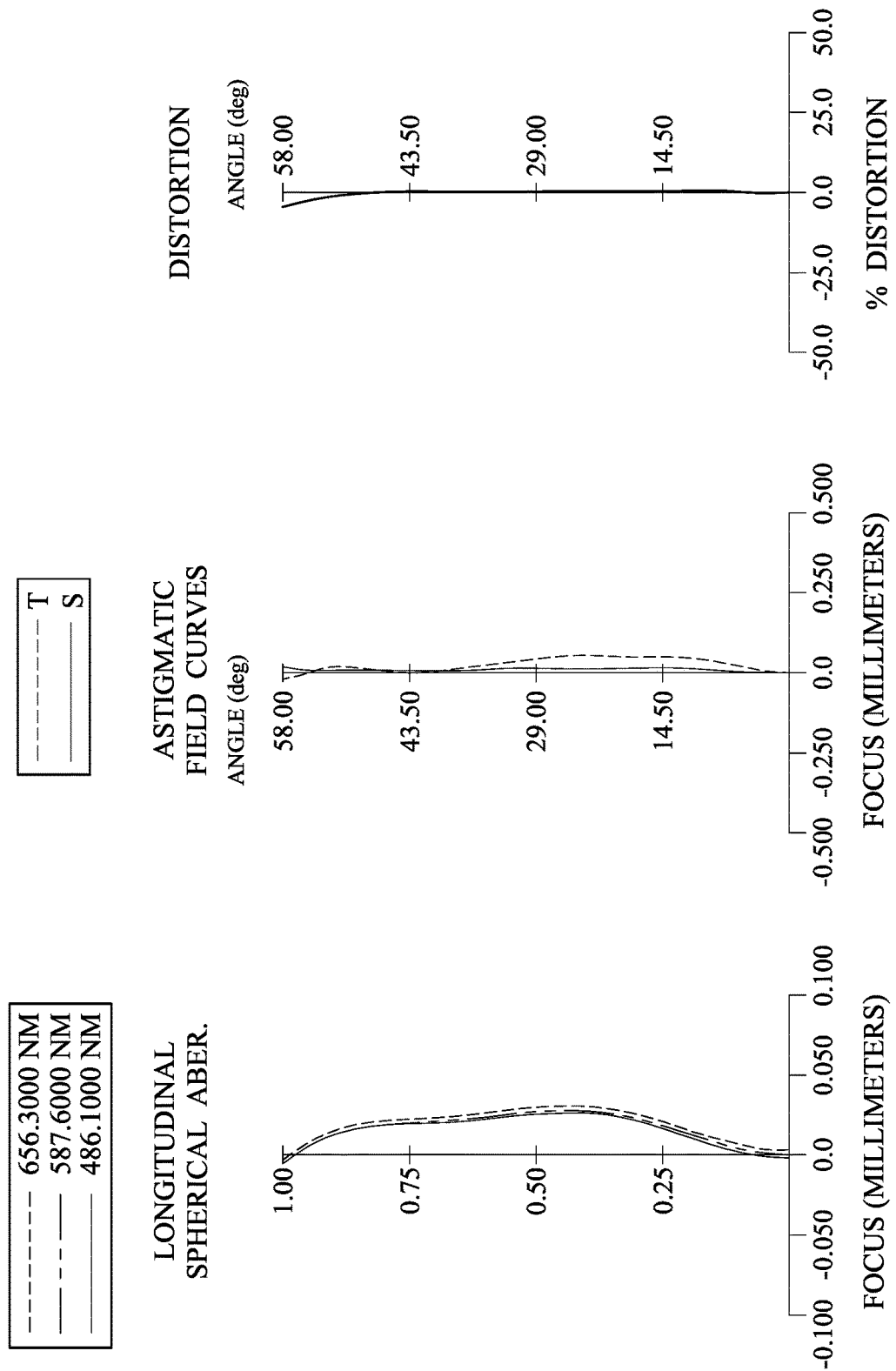
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an optical photographing lens assembly (its reference numeral is omitted) and an image sensor 595. The optical photographing lens assembly includes, in order from an object side to an image side, a first lens element 510, a second lens element 520, an aperture stop 500, a third lens element 530, a fourth lens element 540, a fifth lens element 550, a sixth lens element 560, a seventh lens element 570, a filter 580 and an image surface 590, wherein the image sensor 595 is disposed on the image surface 590 of the optical photographing lens assembly. The optical photographing lens assembly includes seventh lens elements (510, 520, 530, 540, 550, 560, 570) with air gaps between all adjacent lens elements, and without additional one or more lens elements inserted between the first lens element 510 and the seventh lens element 570.

The first lens element 510 with negative refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric. Furthermore, each of the object-side surface 511 and the image-side surface 512 of the first lens element 510 includes at least one inflection point.

The second lens element 520 with positive refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with positive refractive power has an object-side surface 561 being convex in a paraxial region thereof and an image-side surface 562 being convex in a paraxial region thereof. The sixth lens element 560 is made of a plastic material, and has the object-side surface 561 and the image-side surface 562 being both aspheric. Furthermore, each of the object-side surface 561 and the image-side surface 562 of the sixth lens element 560 includes at least one inflection point.

The seventh lens element 570 with negative refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Furthermore, each of the object-side surface 571 and the image-side surface 572 of the seventh lens element 570 includes at least one inflection point.

The filter 580 is made of a glass material and located between the seventh lens element 570 and the image surface 590, and will not affect the focal length of the optical photographing lens assembly.

The detailed optical data of the 5th embodiment are shown in Table 9 and the aspheric surface data are shown in Table 10 below.

TABLE 9

5th Embodiment
f = 2.09 mm, Fno = 1.95, HFOV = 58.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 243.902 | ASP | 0.300 | Glass | 1.603 | 60.7 | −3.17 |
| 2 | | 1.894 | ASP | 0.405 | | | | |
| 3 | Lens 2 | 1.277 | ASP | 0.300 | Plastic | 1.566 | 37.4 | 5.23 |
| 4 | | 2.054 | ASP | 0.477 | | | | |
| 5 | Ape. Stop | Plano | | −0.010 | | | | |
| 6 | Lens 3 | 5.866 | ASP | 0.759 | Plastic | 1.534 | 57.5 | 3.70 |
| 7 | | −2.845 | ASP | 0.196 | | | | |
| 8 | Lens 4 | 8.021 | ASP | 0.641 | Plastic | 1.544 | 55.9 | 4.68 |
| 9 | | −3.624 | ASP | 0.169 | | | | |
| 10 | Lens 5 | −0.937 | ASP | 0.220 | Plastic | 1.669 | 19.5 | −2.56 |
| 11 | | −2.267 | ASP | 0.025 | | | | |
| 12 | Lens 6 | 1.769 | ASP | 0.732 | Plastic | 1.544 | 55.9 | 2.57 |
| 13 | | −5.631 | ASP | 0.080 | | | | |
| 14 | Lens 7 | 0.861 | ASP | 0.388 | Plastic | 1.559 | 40.4 | −28.9 |
| 15 | | 0.686 | ASP | 0.672 | | | | |
| 16 | Filter | Plano | | 0.190 | Glass | 1.517 | 64.2 | — |
| 17 | | Plano | | 0.331 | | | | |
| 18 | Image | Plano | | — | | | | |

Reference wavelength is 587.6 nm (d-line).

TABLE 10

Aspheric Coefficients

| | Surface # | | | | |
|---|---|---|---|---|---|
| | 1 | 2 | 3 | 4 | 6 |
| k = | 1.0000E+00 | −1.1831E+00 | −7.6775E−01 | −1.3972E+00 | −2.9594E+00 |
| A4 = | 1.2768E+00 | −6.5982E−02 | −5.0207E−02 | 2.0131E−01 | −5.6571E−03 |
| A6 = | −9.8743E−01 | 4.4302E−02 | 6.9453E−02 | −5.1140E−01 | −3.4832E−02 |
| A8 = | −2.0346E+00 | −3.0918E−02 | −2.4851E−01 | 3.4895E+00 | 3.7644E−02 |
| A10 = | 9.5389E+00 | 1.1964E−02 | 7.2070E−01 | −1.1411E+01 | −1.8022E−01 |
| A12 = | −1.6654E+01 | −2.4016E−03 | −1.1289E+00 | 2.1989E+01 | 1.3623E−01 |
| A14 = | 1.4308E+01 | 2.3631E−04 | 7.7713E−01 | −2.2867E+01 | |
| A16 = | −4.8463E+00 | −8.9735E−06 | −1.9337E−01 | 9.9575E+00 | |

| | Surface # | | | | |
|---|---|---|---|---|---|
| | 7 | 8 | 9 | 10 | 11 |
| k = | −4.3100E+01 | −8.4565E+00 | −9.2600E−03 | −1.9622E+00 | −1.6053E−01 |
| A4 = | −4.5029E−01 | −2.3741E−01 | −3.7056E−01 | −1.4940E−01 | −2.1817E−01 |
| A6 = | 5.2069E−01 | 1.2475E−01 | −6.1884E−01 | 2.8288E−01 | 4.6577E−01 |
| A8 = | −7.3430E−01 | −1.9028E−01 | 2.8194E+00 | −1.7794E−02 | −2.8073E−01 |
| A10 = | 5.8783E−01 | 2.2270E−01 | −6.1827E+00 | −4.9997E−01 | −9.4502E−02 |
| A12 = | −2.4205E−01 | 5.1839E−02 | 8.2543E+00 | 5.1087E−01 | 2.0436E−01 |
| A14 = | | −3.6260E−01 | −6.5152E+00 | −2.0372E−01 | −9.2764E−02 |
| A16 = | | 1.9340E−01 | 2.2420E+00 | 3.4022E−02 | 1.4062E−02 |

| | Surface # | | | |
|---|---|---|---|---|
| | 12 | 13 | 14 | 15 |
| k = | −5.8754E+00 | −8.9801E+01 | −1.4904E+00 | −2.3499E+00 |
| A4 = | 3.3232E−02 | 3.2176E−01 | −2.9119E−01 | −1.4534E−01 |
| A6 = | −2.6895E−02 | −2.4430E−01 | 1.6215E−01 | 7.1145E−02 |
| A8 = | −8.8361E−03 | 9.5679E−02 | −8.4607E−02 | −2.9763E−02 |
| A10 = | 1.2873E−03 | −2.2446E−02 | 4.1633E−02 | 1.0708E−02 |
| A12 = | 2.7492E−03 | 3.1638E−03 | −1.5764E−02 | −3.0403E−03 |
| A14 = | −9.2490E−04 | −2.4960E−04 | 4.0423E−03 | 6.0987E−04 |
| A16 = | 8.0800E−05 | 8.4028E−06 | −6.4663E−04 | −7.8233E−05 |
| A18 = | | | 5.7537E−05 | 5.6449E−06 |
| A20 = | | | −2.1585E−06 | −1.7240E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.09 | TL/ImgH | 1.82 |
| Fno | 1.95 | (f + TL)/ImgH | 2.47 |
| HFOV [deg.] | 58.0 | BL/ImgH | 0.37 |
| 1/\|tan(HFOV)\| | 0.62 | BL/f | 0.57 |
| Nmax | 1.669 | f/EPD | 1.95 |
| V7 | 40.4 | f/f3 | 0.56 |
| V2 + V5 + V7 | 97.3 | \|f1/f7\| | 0.11 |
| CT7/CT2 | 1.29 | f4/f2 | 0.89 |
| CT7/CT6 | 0.53 | TD/SD | 1.46 |
| ΣAT/ΣCT | 0.40 | R14/Y72 | 0.26 |
| (R3 + R4)/(R3 − R4) | −4.29 | Y11/Y72 | 0.89 |
| (R5 + R6)/(R5 − R6) | 0.35 | Yp61/f | 0.40 |
| (R9 + R10)/(R9 − R10) | −2.41 | Yp62/f | 0.10 |
| (R13 − R14)/(R13 + R14) | 0.11 | | |

6th Embodiment

Figure 11:
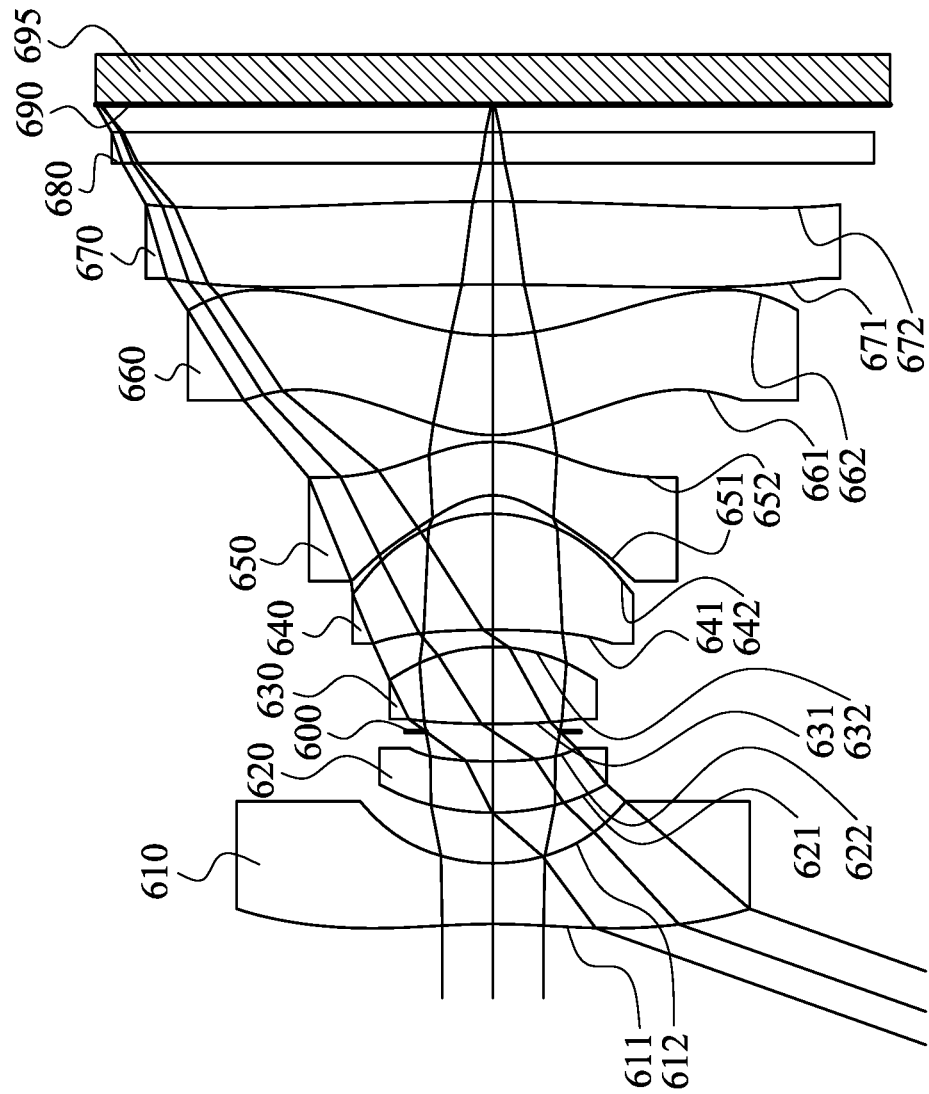
FIG. 11 is a schematic view of an imaging apparatus according to the 6th embodiment of the present disclosure.
Figure 12:
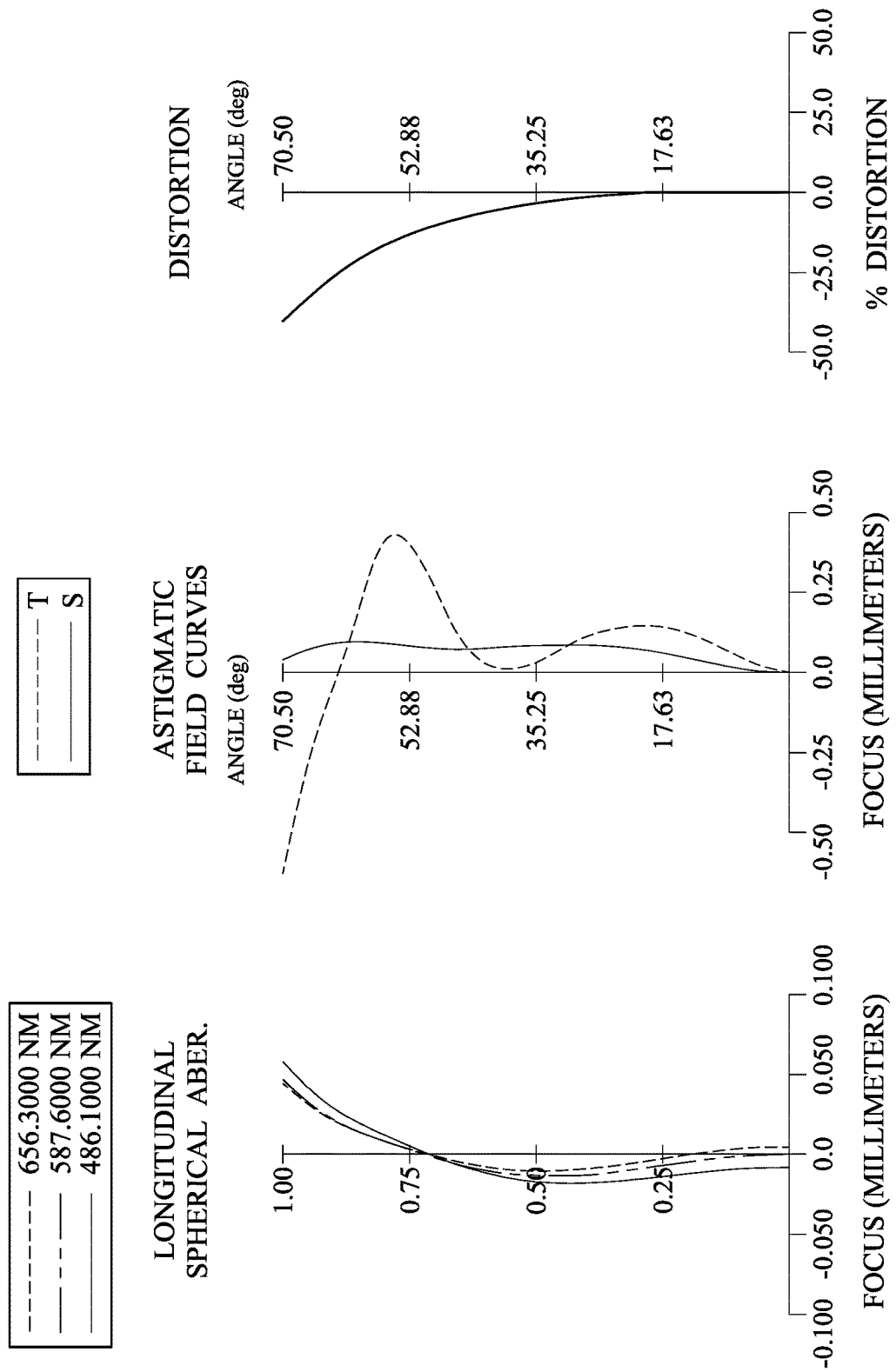
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an optical photographing lens assembly (its reference numeral is omitted) and an image sensor 695. The optical photographing lens assembly includes, in order from an object side to an image side, a first lens element 610, a second lens element 620, an aperture stop 600, a third lens element 630, a fourth lens element 640, a fifth lens element 650, a sixth lens element 660, a seventh lens element 670, a filter 680 and an image surface 690, wherein the image sensor 695 is disposed on the image surface 690 of the optical photographing lens assembly. The optical photographing lens assembly includes seventh lens elements (610, 620, 630, 640, 650, 660, 670) with air gaps between all adjacent lens elements, and without additional one or more lens elements inserted between the first lens element 610 and the seventh lens element 670.

The first lens element 610 with negative refractive power has an object-side surface 611 being concave in a paraxial region thereof and an image-side surface 612 being concave in a paraxial region thereof. The first lens element 610 is made of a plastic material, and has the object-side surface 611 and the image-side surface 612 being both aspheric. Furthermore, the object-side surface 611 of the first lens element 610 includes at least one inflection point.

The second lens element 620 with positive refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, each of the object-side surface 661 and the image-side surface 662 of the sixth lens element 660 includes at least one inflection point.

The seventh lens element 670 with positive refractive power has an object-side surface 671 being concave in a paraxial region thereof and an image-side surface 672 being convex in a paraxial region thereof. The seventh lens element 670 is made of a plastic material, and has the object-side surface 671 and the image-side surface 672 being both aspheric. Furthermore, each of the object-side surface 671 and the image-side surface 672 of the seventh lens element 670 includes at least one inflection point.

The filter 680 is made of a glass material and located between the seventh lens element 670 and the image surface 690, and will not affect the focal length of the optical photographing lens assembly.

The detailed optical data of the 6th embodiment are shown in Table 11 and the aspheric surface data are shown in Table 12 below.

TABLE 11

6th Embodiment
f = 1.56 mm, Fno = 2.28, HFOV = 70.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.916 | ASP | 0.412 | Plastic | 1.545 | 56.1 | −1.78 |
| 2 | | 1.241 | ASP | 0.343 | | | | |
| 3 | Lens 2 | 1.629 | ASP | 0.348 | Plastic | 1.660 | 20.4 | 4.75 |
| 4 | | 3.105 | ASP | 0.202 | | | | |

TABLE 11-continued

6th Embodiment
f = 1.56 mm, Fno = 2.28, HFOV = 70.5 deg.

| Surface # | | Curvature Radius | | Thickness | Material | Index | Abbe # | Focal Length |
|---|---|---|---|---|---|---|---|---|
| 5 | Ape. Stop | Plano | | 0.052 | | | | |
| 6 | Lens 3 | 7.088 | ASP | 0.522 | Plastic | 1.545 | 56.1 | 1.89 |
| 7 | | −1.177 | ASP | 0.116 | | | | |
| 8 | Lens 4 | −5.923 | ASP | 0.787 | Plastic | 1.545 | 56.1 | 2.10 |
| 9 | | −1.005 | ASP | 0.125 | | | | |
| 10 | Lens 5 | −0.437 | ASP | 0.362 | Plastic | 1.660 | 20.4 | −1.80 |
| 11 | | −0.918 | ASP | 0.047 | | | | |
| 12 | Lens 6 | 0.916 | ASP | 0.676 | Plastic | 1.534 | 55.9 | 2.92 |
| 13 | | 1.653 | ASP | 0.344 | | | | |
| 14 | Lens 7 | −23.918 | ASP | 0.564 | Plastic | 1.559 | 40.4 | 167.34 |
| 15 | | −19.206 | ASP | 0.259 | | | | |
| 16 | Filter | Plano | | 0.210 | Glass | 1.517 | 64.2 | — |
| 17 | | Plano | | 0.188 | | | | |
| 18 | Image | Plano | | — | | | | |

Reference wavelength is 587.6 nm (d-line).

TABLE 12

Aspheric Coefficients

| | Surface # | | | | |
|---|---|---|---|---|---|
| | 1 | 2 | 3 | 4 | 6 |
| k = | 2.9102E+00 | 3.2093E−02 | −2.3567E+00 | −1.2683E+01 | −6.0180E+01 |
| A4 = | 1.2685E−01 | 9.5576E−02 | −1.0021E−01 | 5.2444E−02 | 1.5521E−01 |
| A6 = | −6.7093E−02 | −1.5516E+00 | 2.7681E−01 | 1.3882E+00 | −4.6768E−01 |
| A8 = | 3.0037E−02 | 7.4904E+00 | 1.4602E+00 | −1.9805E+00 | 1.4080E+00 |
| A10 = | −9.6625E−03 | −1.5907E+01 | −5.3992E+00 | 4.7577E−01 | −1.3290E+00 |
| A12 = | 2.0730E−03 | 1.7582E+01 | 7.1501E+00 | 9.9338E+00 | 2.5889E−06 |
| A14 = | −2.5527E−04 | −9.8599E+00 | −3.7433E+00 | 2.5837E−08 | 4.6712E−08 |
| A16 = | 1.3498E−05 | 2.1823E+00 | −1.7938E−08 | −7.8651E−15 | 1.4209E−10 |

| | Surface # | | | | |
|---|---|---|---|---|---|
| | 7 | 8 | 9 | 10 | 11 |
| k = | −1.7904E+00 | 3.0918E+01 | −5.2115E−01 | −1.2625E+00 | −5.1865E+00 |
| A4 = | −1.5434E−01 | −1.5492E−02 | −1.3313E−01 | 1.3568E+00 | −1.8756E−01 |
| A6 = | 3.2243E−01 | −1.8925E−01 | 6.0274E−01 | −3.2819E+00 | 8.8992E−01 |
| A8 = | −1.4083E+00 | 7.4988E−01 | −9.7902E−01 | 6.6951E+00 | −1.1915E+00 |
| A10 = | 1.8937E+00 | −1.6571E+00 | 1.4232E−01 | −9.9087E+00 | 8.4897E−01 |
| A12 = | −1.1211E−01 | 1.4385E+00 | 4.8583E−01 | 7.8992E+00 | −3.4521E−01 |
| A14 = | −3.4434E−07 | −3.3391E−01 | −1.3482E−01 | −2.5911E+00 | 7.5453E−02 |
| A16 = | −7.3012E−09 | | | 1.0990E−01 | −6.9119E−03 |

| | Surface # | | | |
|---|---|---|---|---|
| | 12 | 13 | 14 | 15 |
| k = | −4.0128E+00 | −8.8050E−01 | 1.4018E+01 | −6.5392E+00 |
| A4 = | −1.6795E−01 | −1.0970E−01 | 6.0765E−03 | 3.2847E−03 |
| A6 = | 1.7854E−01 | 1.1758E−02 | −2.4938E−04 | 1.0789E−03 |
| A8 = | −1.3517E−01 | 7.9150E−03 | 1.6177E−04 | −6.8191E−04 |
| A10 = | 5.4862E−02 | −5.0880E−03 | −4.6943E−05 | 1.8747E−04 |
| A12 = | −1.2177E−02 | 1.1772E−03 | 7.4583E−06 | −2.5303E−05 |
| A14 = | 1.4322E−03 | −1.2375E−04 | −5.5874E−07 | 1.6971E−06 |
| A16 = | −7.0811E−05 | 5.0074E−06 | 1.6402E−08 | −4.5224E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.56 | TL/ImgH | 2.10 |
| Fno | 2.28 | (f + TL)/ImgH | 2.69 |
| HFOV [deg.] | 70.5 | BL/ImgH | 0.25 |
| 1/|tan(HFOV)| | 0.35 | BL/f | 0.42 |
| Nmax | 1.660 | f/EPD | 2.28 |
| V7 | 40.4 | f/f3 | 0.83 |
| V2 + V5 + V7 | 81.2 | |f1/f7| | 0.01 |

-continued

6th Embodiment

| | | | |
|---|---|---|---|
| CT7/CT2 | 1.62 | f4/f2 | 0.44 |
| CT7/CT6 | 0.83 | TD/SD | 1.36 |
| ΣAT/ΣCT | 0.33 | R14/Y72 | −8.17 |
| (R3 + R4)/(R3 − R4) | −3.21 | Y11/Y72 | 0.74 |
| (R5 + R6)/(R5 − R6) | 0.72 | Yp61/f | 0.39 |
| (R9 + R10)/(R9 − R10) | −2.81 | Yp62/f | 0.50 |
| (R13 − R14)/(R13 + R14) | 0.11 | | |

7th Embodiment

Figure 13:
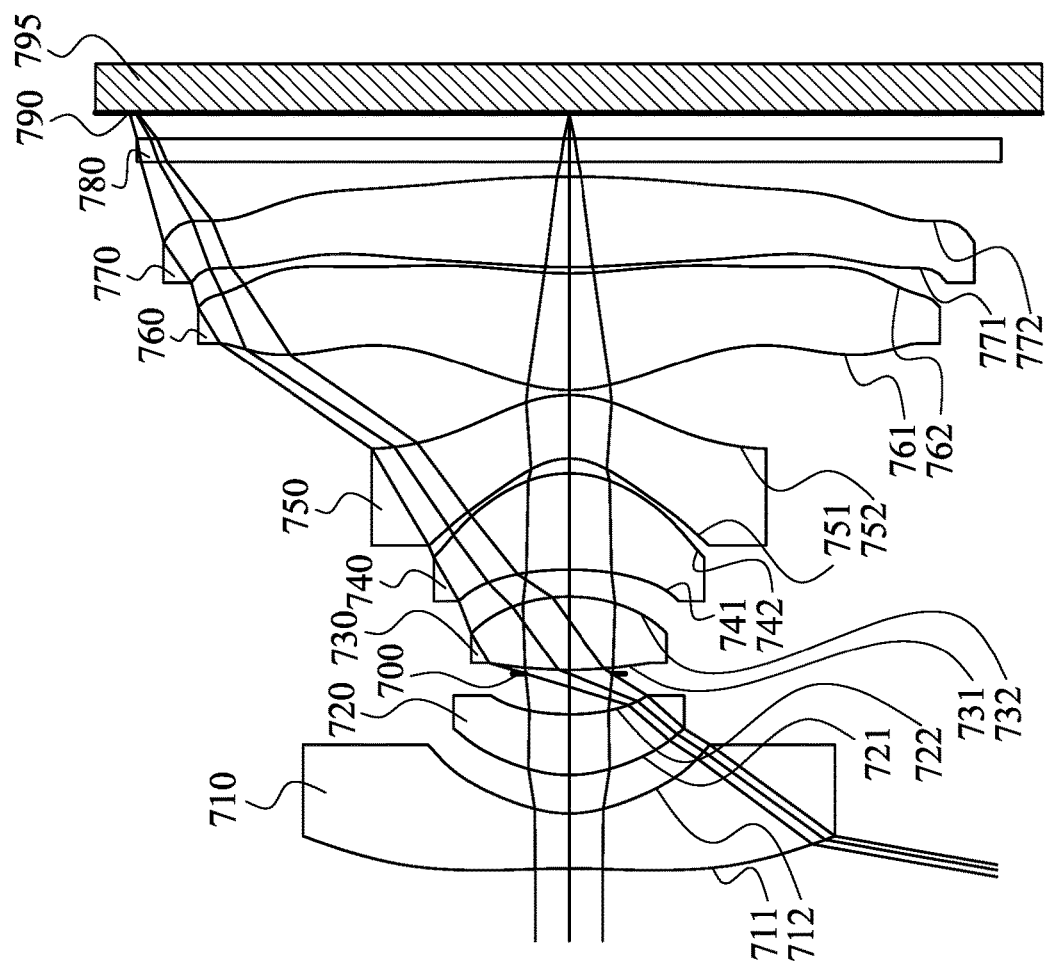
FIG. 13 is a schematic view of an imaging apparatus according to the 7th embodiment of the present disclosure.
Figure 14:
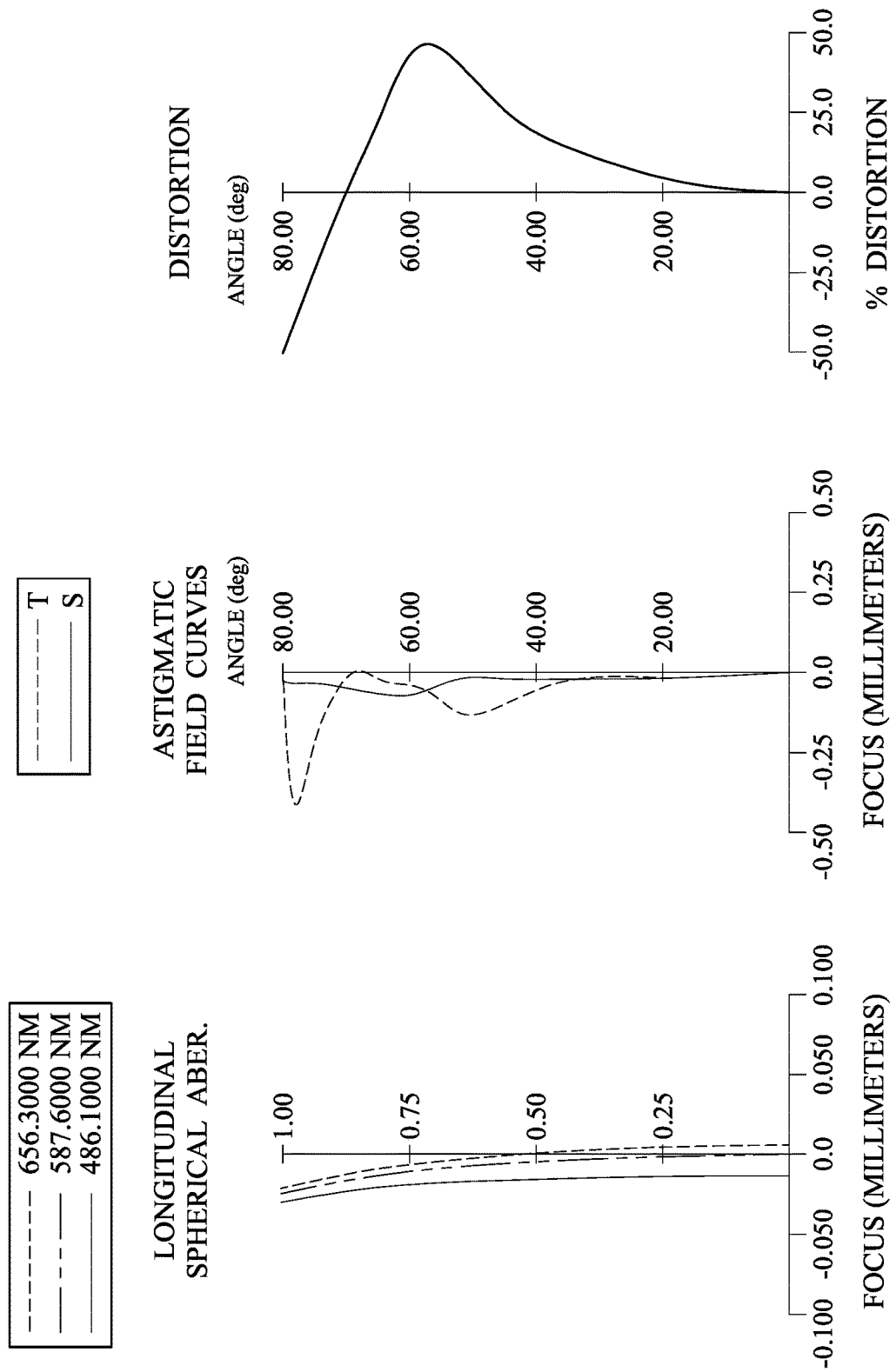
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an optical photographing lens assembly (its reference numeral is omitted) and an image sensor 795. The optical photographing lens assembly includes, in order from an object side to an image side, a first lens element 710, a second lens element 720, an aperture stop 700, a third lens element 730, a fourth lens element 740, a fifth lens element 750, a sixth lens element 760, a seventh lens element 770, a filter 780 and an image surface 790, wherein the image sensor 795 is disposed on the image surface 790 of the optical photographing lens assembly. The optical photographing lens assembly includes seventh lens elements (710, 720, 730, 740, 750, 760, 770) with air gaps between all adjacent lens elements, and without additional one or more lens elements inserted between the first lens element 710 and the seventh lens element 770.

The first lens element 710 with negative refractive power has an object-side surface 711 being concave in a paraxial region thereof and an image-side surface 712 being concave in a paraxial region thereof. The first lens element 710 is made of a plastic material, and has the object-side surface 711 and the image-side surface 712 being both aspheric. Furthermore, each of the object-side surface 711 and the image-side surface 712 of the first lens element 710 includes at least one inflection point.

The second lens element 720 with positive refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, each of the object-side surface 761 and the image-side surface 762 of the sixth lens element 760 includes at least one inflection point.

The seventh lens element 770 with positive refractive power has an object-side surface 771 being convex in a paraxial region thereof and an image-side surface 772 being convex in a paraxial region thereof. The seventh lens element 770 is made of a plastic material, and has the object-side surface 771 and the image-side surface 772 being both aspheric. Furthermore, each of the object-side surface 771 and the image-side surface 772 of the seventh lens element 770 includes at least one inflection point.

The filter 780 is made of a glass material and located between the seventh lens element 770 and the image surface 790, and will not affect the focal length of the optical photographing lens assembly.

The detailed optical data of the 7th embodiment are shown in Table 13 and the aspheric surface data are shown in Table 14 below.

TABLE 13

7th Embodiment
f = 1.05 mm, Fno = 2.26, HFOV = 80.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −6.645 | ASP | 0.377 | Plastic | 1.545 | 56.1 | −1.34 |
| 2 | | 0.839 | ASP | 0.264 | | | | |
| 3 | Lens 2 | 0.909 | ASP | 0.415 | Plastic | 1.660 | 20.4 | 2.72 |
| 4 | | 1.507 | ASP | 0.276 | | | | |
| 5 | Ape. Stop | Plano | | 0.028 | | | | |
| 6 | Lens 3 | 3.097 | ASP | 0.505 | Plastic | 1.545 | 56.1 | 1.60 |
| 7 | | −1.146 | ASP | 0.186 | | | | |
| 8 | Lens 4 | −2.153 | ASP | 0.657 | Plastic | 1.545 | 56.1 | 2.03 |
| 9 | | −0.810 | ASP | 0.102 | | | | |
| 10 | Lens 5 | −0.432 | ASP | 0.434 | Plastic | 1.669 | 19.5 | −2.38 |
| 11 | | −0.831 | ASP | 0.035 | | | | |
| 12 | Lens 6 | 1.033 | ASP | 0.803 | Plastic | 1.544 | 56.0 | 2.68 |
| 13 | | 2.588 | ASP | 0.042 | | | | |

TABLE 13-continued

7th Embodiment
f = 1.05 mm, Fno = 2.26, HFOV = 80.0 deg.

| Surface # | | Curvature Radius | Thickness | | Material | Index | Abbe # | Focal Length |
|---|---|---|---|---|---|---|---|---|
| 14 | Lens 7 | 4.355 | ASP | 0.620 | Plastic | 1.660 | 20.4 | 4.44 |
| 15 | | −8.449 | ASP | 0.100 | | | | |
| 16 | Filter | Plano | | 0.160 | Glass | 1.517 | 64.2 | — |
| 17 | | Plano | | 0.176 | | | | |
| 18 | Image | Plano | | — | | | | |

Reference wavelength is 587.6 nm (d-line).

TABLE 14

Aspheric Coefficients

| | Surface # | | | | |
|---|---|---|---|---|---|
| | 1 | 2 | 3 | 4 | 6 |
| k = | 2.0936E+00 | −7.0010E−01 | −2.9881E+00 | 2.4912E+00 | −3.2951E+01 |
| A4 = | 1.7453E+00 | −6.8938E−01 | −6.0827E−02 | 4.0586E−02 | 7.7610E−02 |
| A6 = | −4.5372E+00 | 1.6076E+00 | 2.0960E−01 | 7.3602E−01 | 5.8084E−02 |
| A8 = | 8.1806E+00 | −3.7333E+00 | 1.2182E+00 | −1.2867E−01 | −1.1954E−01 |
| A10 = | −6.5008E+00 | 6.0070E+00 | −5.2150E+00 | −2.5010E+00 | −3.3266E−01 |
| A12 = | −1.1564E+00 | −5.3726E+00 | 1.0769E+01 | 7.2887E+00 | −1.3723E−20 |
| A14 = | 4.6686E+00 | 2.7296E+00 | −8.2597E+00 | −2.9791E−22 | −2.9791E−22 |
| A16 = | −1.9035E+00 | −7.2314E−01 | | | |

| | Surface # | | | | |
|---|---|---|---|---|---|
| | 7 | 8 | 9 | 10 | 11 |
| k = | −6.1490E−01 | 3.7472E+00 | −5.9323E−01 | −1.0274E+00 | −2.9850E+00 |
| A4 = | −1.2308E−01 | −5.4053E−02 | −2.0412E−01 | 1.3023E+00 | −1.4453E−01 |
| A6 = | 1.3183E−01 | −2.9505E−01 | 4.6792E−01 | −2.4170E+00 | 7.5217E−01 |
| A8 = | −2.6238E+00 | 1.2515E+00 | 2.8284E+00 | 8.1253E+00 | −9.6867E−01 |
| A10 = | 6.7536E+00 | −4.1472E+00 | −1.1702E+01 | −2.0205E+01 | 6.2728E−01 |
| A12 = | −6.6887E+00 | 5.6133E+00 | 1.6445E+01 | 2.5966E+01 | −2.0689E−01 |
| A14 = | −2.9791E−22 | −3.0503E+00 | −9.9162E+00 | −1.6303E+01 | 2.7691E−02 |
| A16 = | | | 2.2234E+00 | 4.0207E+00 | −5.2547E−05 |

| | Surface # | | | |
|---|---|---|---|---|
| | 12 | 13 | 14 | 15 |
| k = | −3.3747E+00 | −4.6690E−01 | −1.2510E+01 | 4.7185E+00 |
| A4 = | −1.4334E−01 | −2.7868E−01 | −1.2279E−01 | −2.6170E−02 |
| A6 = | 1.2456E−01 | 2.0777E−01 | 1.1681E−01 | 4.8830E−02 |
| A8 = | −9.6418E−02 | −1.0179E−01 | −5.2487E−02 | −2.7467E−02 |
| A10 = | 4.1881E−02 | 3.3958E−02 | 1.1249E−02 | 9.0654E−03 |
| A12 = | −1.0048E−02 | −7.2962E−03 | −9.4018E−04 | −2.0917E−03 |
| A14 = | 1.3440E−03 | 9.0335E−04 | −4.6919E−05 | 3.1547E−04 |
| A16 = | −9.2855E−05 | −5.4573E−05 | 1.4370E−05 | −2.6202E−05 |
| A18 = | 2.4998E−06 | 1.0625E−06 | −7.7842E−07 | 8.8290E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.05 | TL/ImgH | 1.74 |
| Fno | 2.26 | (f + TL)/ImgH | 2.10 |

-continued

| 7th Embodiment | | | |
|---|---|---|---|
| HFOV [deg.] | 80.0 | BL/ImgH | 0.15 |
| 1/|tan(HFOV)| | 0.18 | BL/f | 0.41 |
| Nmax | 1.669 | f/EPD | 2.26 |
| V7 | 20.4 | f/f3 | 0.66 |
| V2 + V5 + V7 | 60.2 | |f1/f7| | 0.30 |
| CT7/CT2 | 1.49 | f4/f2 | 0.75 |
| CT7/CT6 | 0.77 | TD/SD | 1.39 |
| ΣAT/ΣCT | 0.24 | R14/Y72 | −3.04 |
| (R3 + R4)/(R3 − R4) | −4.04 | Y11/Y72 | 0.66 |
| (R5 + R6)/(R5 − R6) | 0.46 | Yp61/f | 0.62 |
| (R9 + R10)/(R9 − R10) | −3.16 | Yp62/f | 0.38 |
| (R13 − R14)/(R13 + R14) | −3.13 | | |

8th Embodiment

Figure 15:
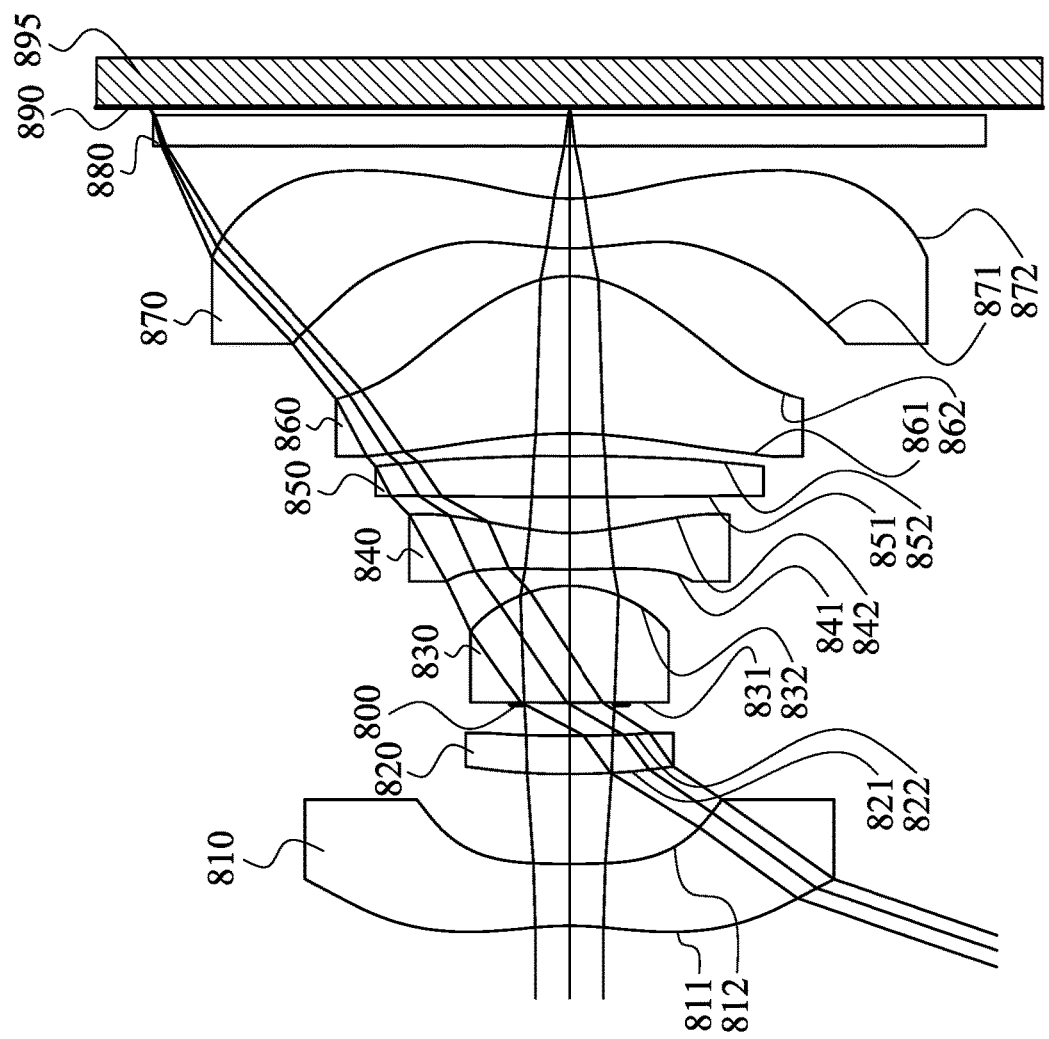
FIG. 15 is a schematic view of an imaging apparatus according to the 8th embodiment of the present disclosure.
Figure 16:
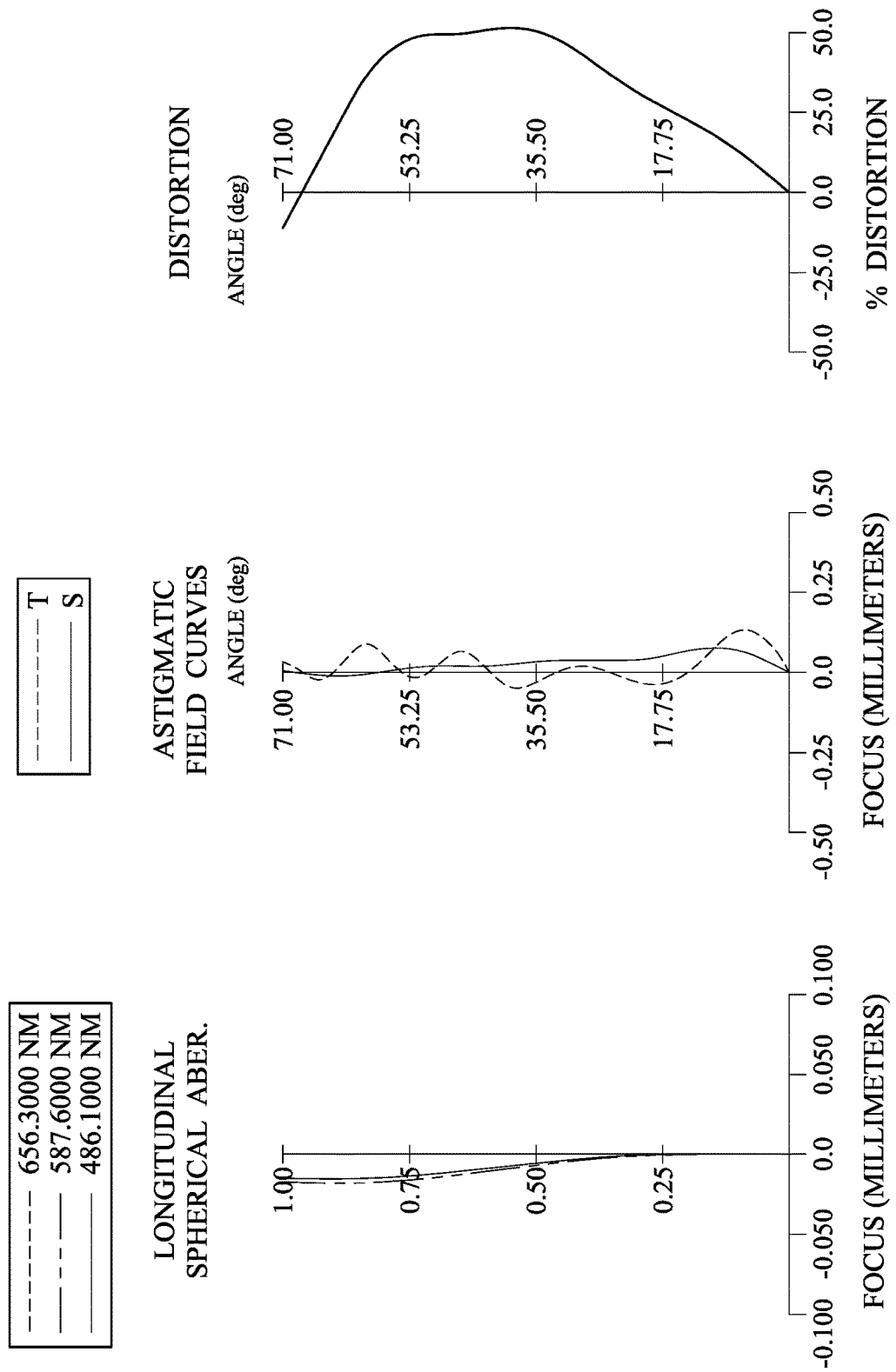
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an optical photographing lens assembly (its reference numeral is omitted) and an image sensor 895. The optical photographing lens assembly includes, in order from an object side to an image side, a first lens element 810, a second lens element 820, an aperture stop 800, a third lens element 830, a fourth lens element 840, a fifth lens element 850, a sixth lens element 860, a seventh lens element 870, a filter 880 and an image surface 890, wherein the image sensor 895 is disposed on the image surface 890 of the optical photographing lens assembly. The optical photographing lens assembly includes seventh lens elements (810, 820, 830, 840, 850, 860, 870) with air gaps between all adjacent lens elements, and without additional one or more lens elements inserted between the first lens element 810 and the seventh lens element 870.

The first lens element 810 with negative refractive power has an object-side surface 811 being concave in a paraxial region thereof and an image-side surface 812 being concave in a paraxial region thereof. The first lens element 810 is made of a plastic material, and has the object-side surface 811 and the image-side surface 812 being both aspheric. Furthermore, each of the object-side surface 811 and the image-side surface 812 of the first lens element 810 includes at least one inflection point.

The second lens element 820 with positive refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric.

The fifth lens element 850 with positive refractive power has an object-side surface 851 being convex in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with positive refractive power has an object-side surface 861 being concave in a paraxial region thereof and an image-side surface 862 being convex in a paraxial region thereof. The sixth lens element 860 is made of a plastic material, and has the object-side surface 861 and the image-side surface 862 being both aspheric. Furthermore, each of the object-side surface 861 and the image-side surface 862 of the sixth lens element 860 includes at least one inflection point.

The seventh lens element 870 with positive refractive power has an object-side surface 871 being convex in a paraxial region thereof and an image-side surface 872 being concave in a paraxial region thereof. The seventh lens element 870 is made of a plastic material, and has the object-side surface 871 and the image-side surface 872 being both aspheric. Furthermore, each of the object-side surface 871 and the image-side surface 872 of the seventh lens element 870 includes at least one inflection point.

The filter 880 is made of a glass material and located between the seventh lens element 870 and the image surface 890, and will not affect the focal length of the optical photographing lens assembly.

The detailed optical data of the 8th embodiment are shown in Table 15 and the aspheric surface data are shown in Table 16 below.

TABLE 15

8th Embodiment
f = 1.10 mm, Fno = 2.33, HFOV = 71.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.323 | ASP | 0.424 | Plastic | 1.545 | 56.1 | −3.24 |
| 2 | | 7.787 | ASP | 0.615 | | | | |
| 3 | Lens 2 | 6.179 | ASP | 0.263 | Plastic | 1.515 | 56.5 | 21.94 |
| 4 | | 13.453 | ASP | 0.216 | | | | |
| 5 | Ape. Stop | Plano | | 0.010 | | | | |
| 6 | Lens 3 | 13.345 | ASP | 0.806 | Plastic | 1.544 | 56.0 | 1.51 |
| 7 | | −0.854 | ASP | 0.112 | | | | |
| 8 | Lens 4 | 4.409 | ASP | 0.250 | Plastic | 1.688 | 18.7 | −3.01 |
| 9 | | 1.376 | ASP | 0.247 | | | | |
| 10 | Lens 5 | 41.628 | ASP | 0.281 | Plastic | 1.544 | 56.0 | 21.58 |
| 11 | | −16.314 | ASP | 0.154 | | | | |
| 12 | Lens 6 | −2.811 | ASP | 1.082 | Plastic | 1.544 | 56.0 | 1.63 |
| 13 | | −0.764 | ASP | 0.190 | | | | |
| 14 | Lens 7 | 1.482 | ASP | 0.342 | Plastic | 1.688 | 18.7 | 205.74 |
| 15 | | 1.357 | ASP | 0.360 | | | | |
| 16 | Filter | Plano | | 0.210 | Glass | 1.517 | 64.2 | — |
| 17 | | Plano | | 0.057 | | | | |
| 18 | Image | Plano | | — | | | | |

Reference wavelength is 587.6 nm (d-line).

TABLE 16

Aspheric Coefficients

| | Surface # | | | | |
|---|---|---|---|---|---|
| | 1 | 2 | 3 | 4 | 6 |
| k = | 3.0764E−01 | −8.3120E+01 | 2.3676E+01 | 4.3431E+01 | −9.0000E+01 |
| A4 = | 4.0146E−01 | 1.7821E−01 | 1.7623E−01 | −4.8553E−02 | −6.7440E−02 |
| A6 = | −3.2874E−01 | 2.6682E+00 | −1.4974E+00 | 2.9185E+00 | −4.0202E−01 |
| A8 = | 1.9828E−01 | −1.0451E+01 | 9.5930E+00 | −2.7854E+01 | −1.6131E+00 |
| A10 = | −7.1964E−02 | 2.0055E+01 | −3.5675E+01 | 1.4539E+02 | −3.3370E−01 |
| A12 = | 1.5154E−02 | −1.9667E+01 | 7.4318E+01 | −4.1194E+02 | 2.4302E−14 |
| A14 = | −1.7659E−03 | 9.3575E+00 | −8.1118E+01 | 5.7236E+02 | 3.8629E−15 |
| A16 = | 9.5968E−05 | −1.7137E+00 | 3.5192E+01 | −3.0626E+02 | 1.0950E−16 |

| | Surface # | | | | |
|---|---|---|---|---|---|
| | 7 | 8 | 9 | 10 | 11 |
| k = | −2.3403E−01 | 2.2969E+00 | −2.6536E+00 | 4.6699E+01 | 8.2158E+01 |
| A4 = | 1.1449E−01 | −5.8832E−01 | −5.4689E−01 | −1.3475E−01 | −1.2105E−01 |
| A6 = | −7.9792E−01 | 8.5265E−01 | 1.0067E+00 | 8.5860E−01 | 5.6516E−01 |
| A8 = | 1.0525E+01 | 8.9913E−01 | −1.1973E+00 | −2.3078E+00 | −9.8975E−01 |
| A10 = | −6.0050E+01 | −8.1988E+00 | 8.3370E−01 | 3.1182E+00 | 7.8161E−01 |
| A12 = | 1.6930E+02 | 1.6381E+01 | −3.4641E−01 | −2.2234E+00 | −2.6193E−01 |
| A14 = | −2.4445E+02 | −1.5021E+01 | 8.8681E−02 | 7.9700E−01 | 1.4038E−02 |
| A16 = | 1.4140E+02 | 5.3388E+00 | −1.4413E−02 | −1.1290E−01 | 6.8899E−03 |

| | Surface # | | | |
|---|---|---|---|---|
| | 12 | 13 | 14 | 15 |
| k = | 2.1892E+00 | −1.3151E+00 | −8.5035E+01 | −4.3427E+00 |
| A4 = | 1.9773E−01 | 2.2527E−02 | 3.0138E+00 | −2.3483E−01 |
| A6 = | −1.4827E−01 | 3.1360E−01 | −7.0184E+01 | 1.8972E−01 |
| A8 = | −1.8120E−01 | −6.4034E−01 | 3.5784E+02 | −9.0854E−02 |
| A10 = | 5.3814E−01 | 5.8252E−01 | −8.8361E+02 | 2.6348E−02 |
| A12 = | −4.6439E−01 | −2.6337E−01 | 1.1588E+03 | −4.6402E−03 |
| A14 = | 1.7626E−01 | 5.7991E−02 | −7.7444E+02 | 4.5544E−04 |
| A16 = | −2.5127E−02 | −4.9533E−03 | 2.0748E+02 | −1.9085E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.10 | TL/ImgH | 1.95 |
| Fno | 2.33 | (f + TL)/ImgH | 2.33 |
| HFOV [deg.] | 71.0 | BL/ImgH | 0.22 |
| 1/|tan(HFOV)| | 0.34 | BL/f | 0.57 |
| Nmax | 1.688 | f/EPD | 2.33 |
| V7 | 18.7 | f/f3 | 0.73 |
| V2 + V5 + V7 | 131.2 | |f1/f7| | 0.02 |
| CT7/CT2 | 1.30 | f4/f2 | −0.14 |
| CT7/CT6 | 0.32 | TD/SD | 1.44 |
| ΣAT/ΣCT | 0.45 | R14/Y72 | 0.55 |
| (R3 + R4)/(R3 − R4) | −2.70 | Y11/Y72 | 0.75 |
| (R5 + R6)/(R5 − R6) | 0.88 | Yp61/f | 0.76 |
| (R9 + R10)/(R9 − R10) | 0.44 | Yp62/f | 0.88 |
| (R13 − R14)/(R13 + R14) | 0.04 | | |

9th Embodiment

Figure 19:
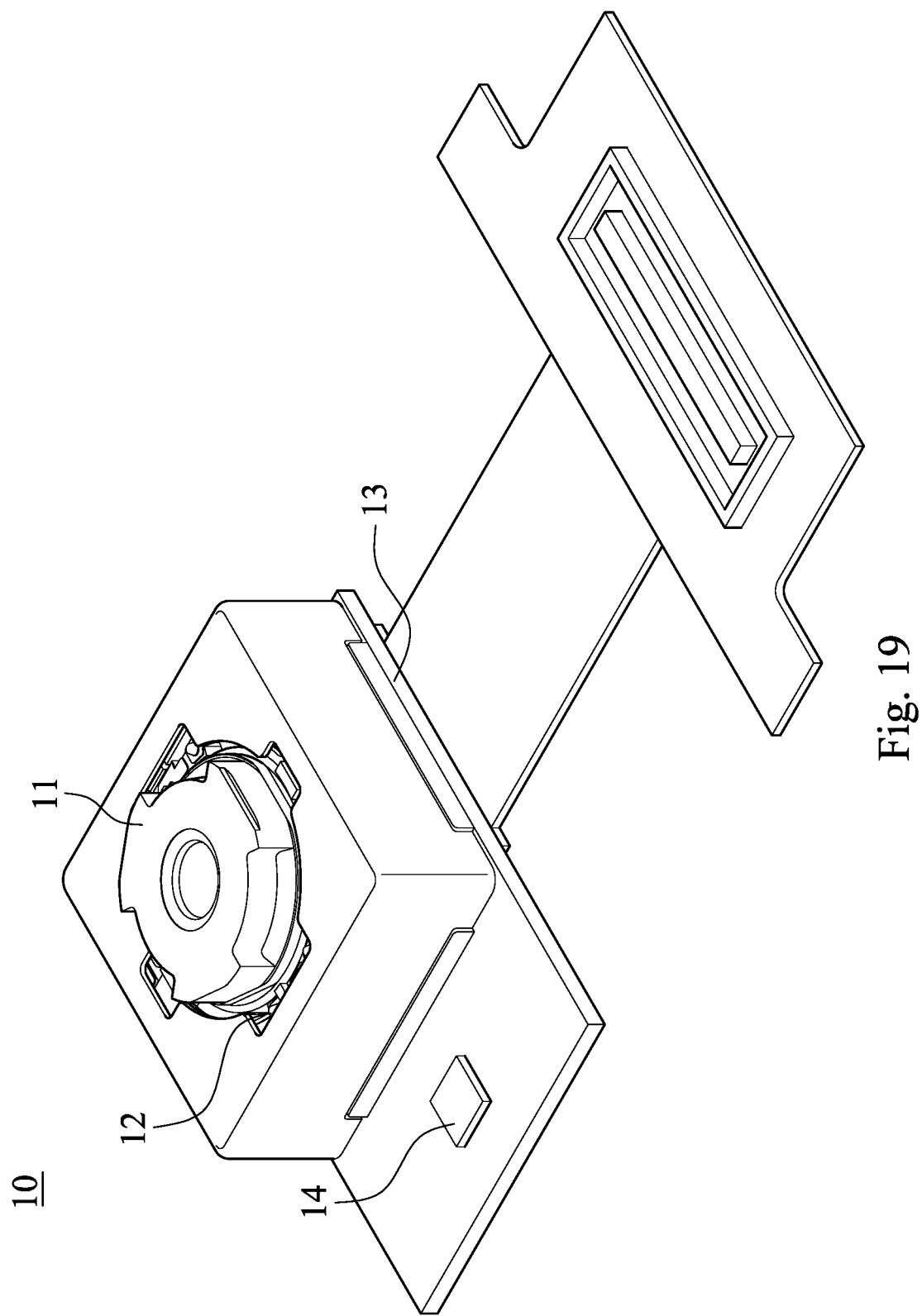
FIG. 19 is a three-dimensional schematic view of an imaging apparatus according to the 9th embodiment of the present disclosure.

FIG. 19 is a three-dimensional schematic view of an imaging apparatus 10 according to the 9th embodiment of the present disclosure. In FIG. 19, the imaging apparatus 10 of the 9th embodiment is a camera module, the imaging apparatus 10 includes an imaging lens assembly 11, a driving apparatus 12 and an image sensor 13, wherein the imaging lens assembly 11 includes the optical photographing lens assembly of the 1st embodiment and a lens barrel (not shown in drawings) for carrying the optical photographing lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The optical photographing lens assembly can obtain a favorable imaging position by the driving apparatus 12 so as to capture clear images when the imaged object is disposed at different object distances.

The imaging apparatus 10 can include the image sensor 13 located on the image surface of the optical photographing lens assembly, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 9th embodiment, the image stabilization module 14 is a gyro sensor, but is not limited thereto. Therefore, the variation of different axial directions of the optical photographing lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

10th Embodiment

Figure 20A:
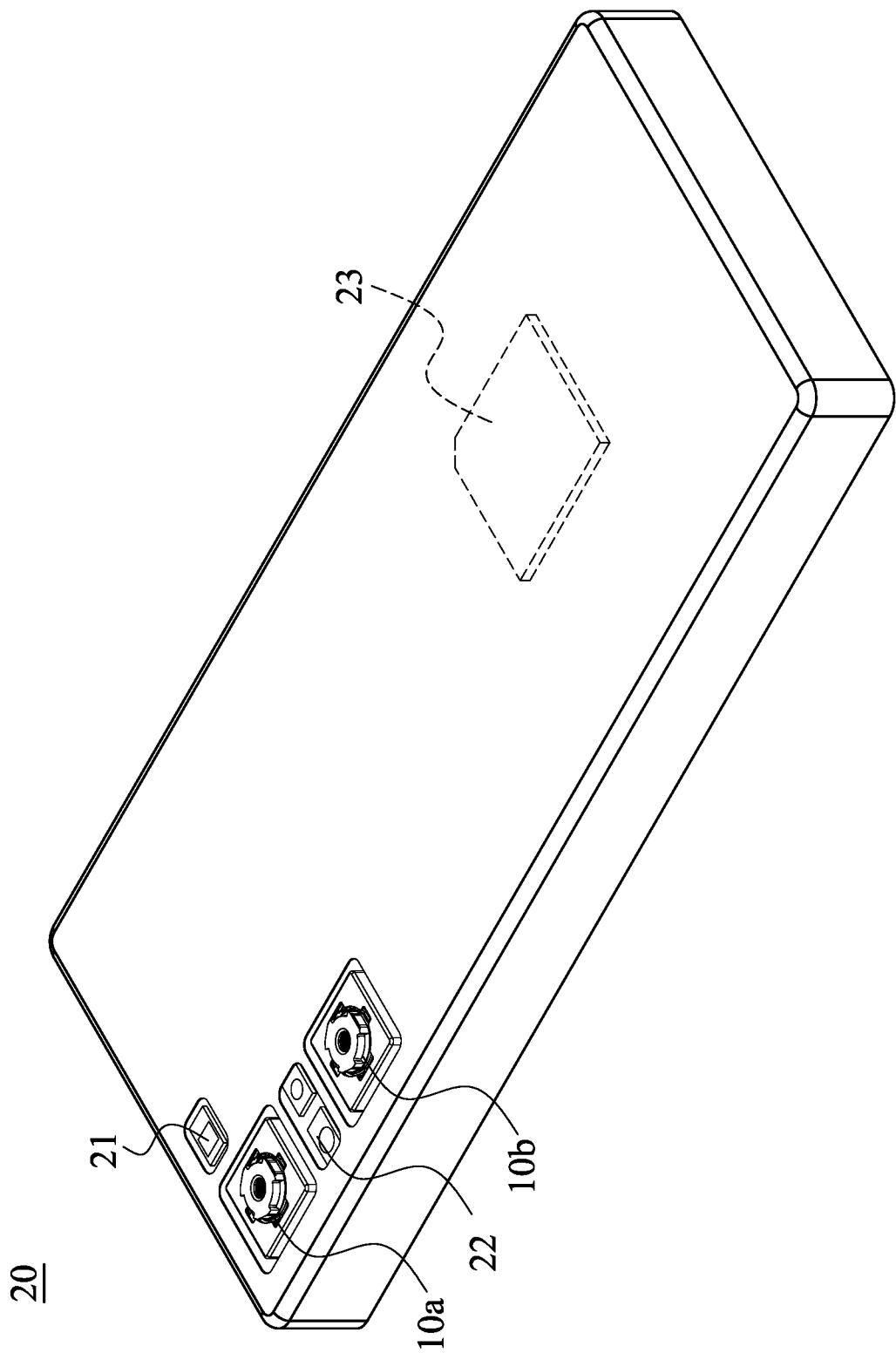
FIG. 20A is a schematic view of one side of an electronic device according to the 10th embodiment of the present disclosure.
Figure 20B:
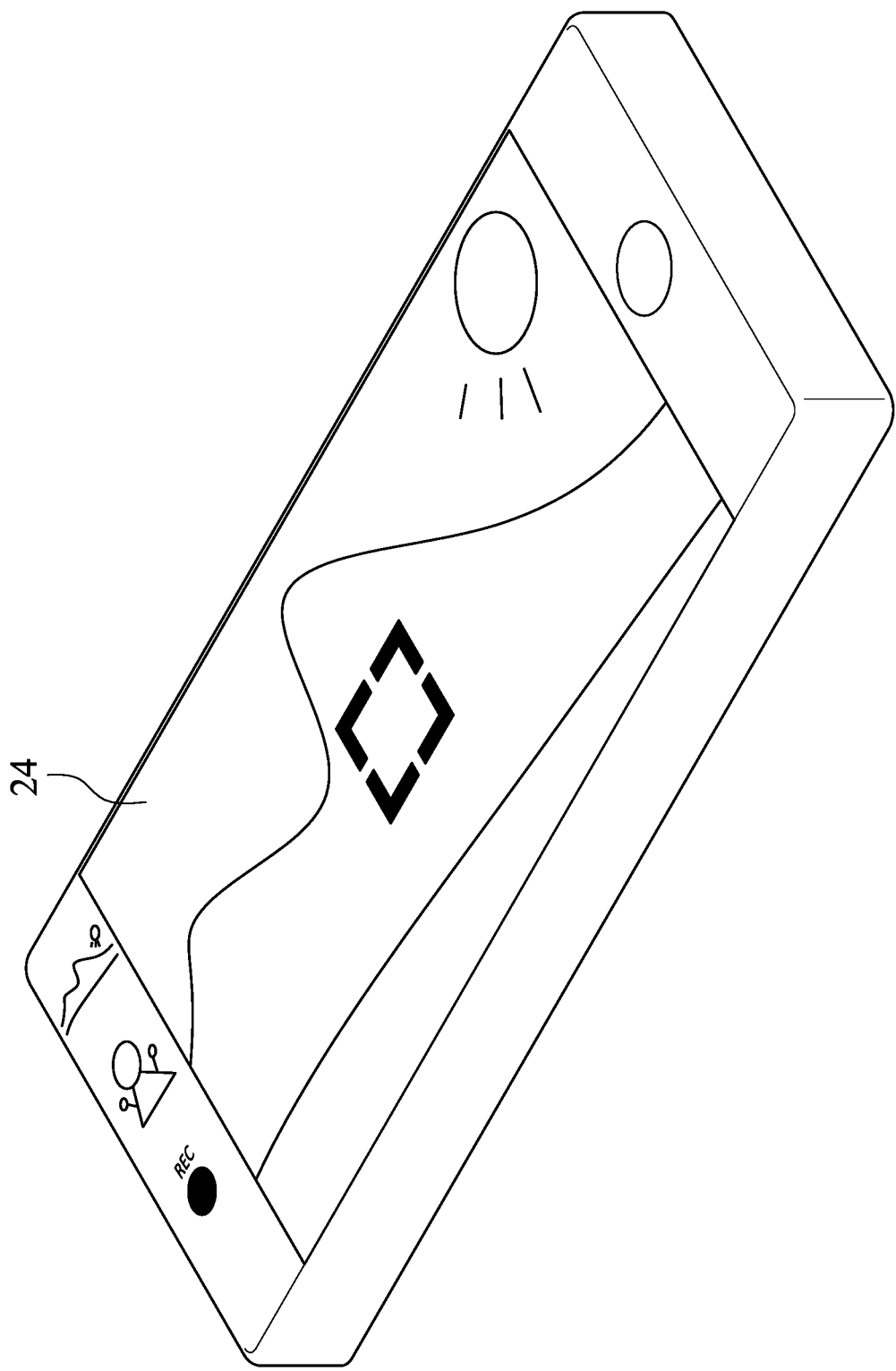
FIG. 20B is a schematic view of another side of the electronic device of FIG. 20A.
Figure 20C:
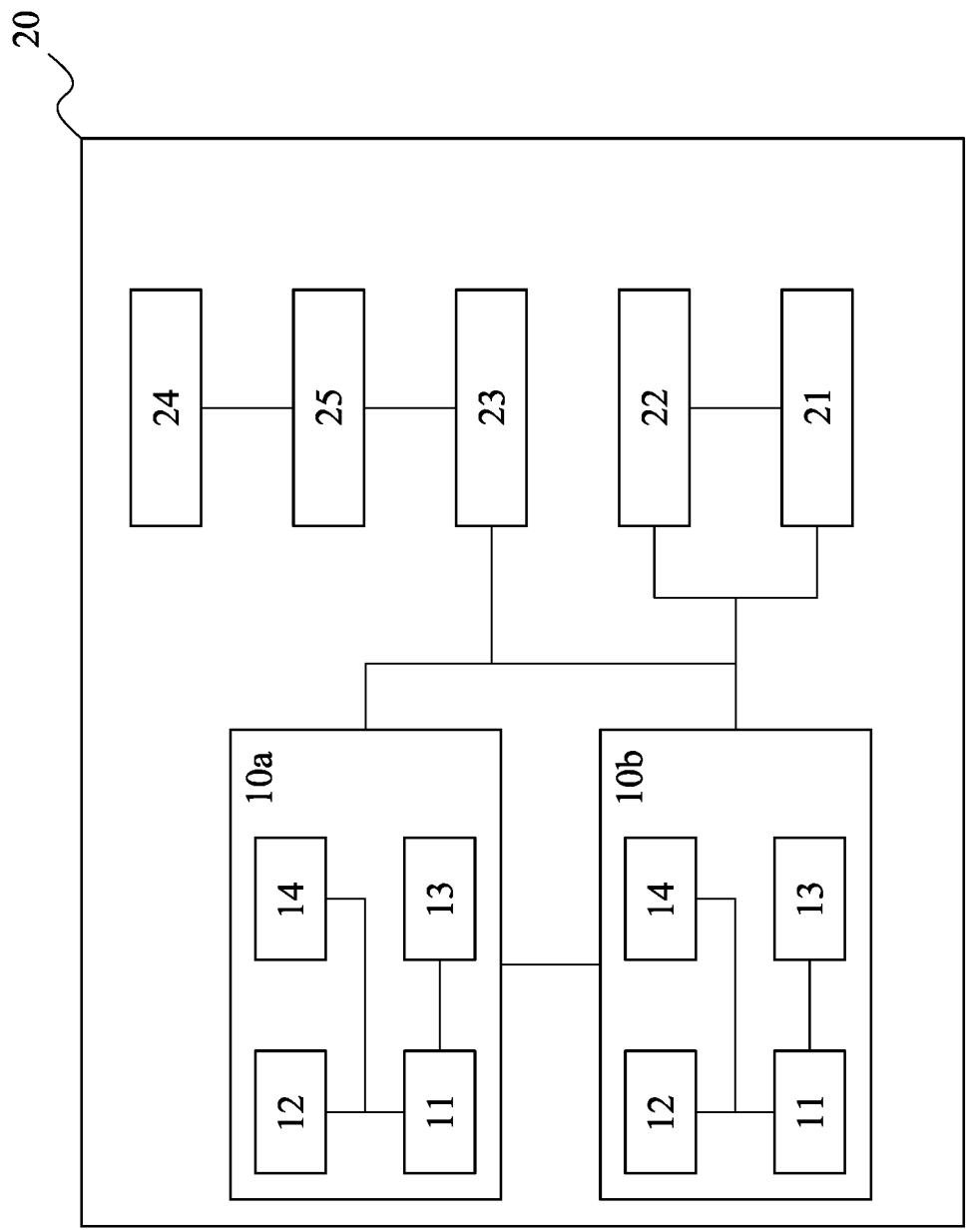
FIG. 20C is a system schematic view of the electronic device of FIG. 20A.
Figure 20C:
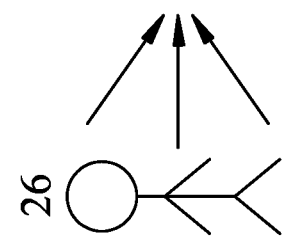

FIG. 20A is a schematic view of one side of an electronic device 20 according to the 10th embodiment of the present disclosure. FIG. 20B is a schematic view of another side of the electronic device 20 of FIG. 20A. FIG. 20C is a system schematic view of the electronic device 20 of FIG. 20A. In FIGS. 20A, 20B and 20C, the electronic device 20 according to the 10th embodiment is a smartphone, wherein the electronic device 20 includes two imaging apparatuses, a flash module 21, a focusing assisting module 22, an image signal processor (ISP) 23, a user interface 24 and an image software processor 25. When the user captures images of an imaged object 26 via the user interface 24, the electronic device 20 focuses and generates an image via the imaging apparatus while compensating for low illumination via the flash module 21 when necessary. Then, the electronic device 20 quickly focuses on the imaged object according to its object distance information provided by the focusing assisting module 22, and optimizes the image via the image signal processor 23 (ISP) and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

According to the 10th embodiment, the two imaging apparatuses are a first imaging apparatus 10a and a second imaging apparatus 10b, which are face toward a same direction, and each of the first imaging apparatus 10a and the second imaging apparatus 10b has single focus. Each of the first imaging apparatus 10a and the second imaging apparatus 10b has a field of view ranging between 60 degrees and 90 degrees and between 90 degrees and 180 degrees, respectively. Hence, the applicability thereof can be enhanced.

Moreover, according to the 10th embodiment, each of the first imaging apparatus 10a and the second imaging apparatus 10b is the same as the imaging apparatus 10 according to the 9th embodiment (in FIG. 20C, the reference numeral of each element of each of the first imaging apparatus 10a and the second imaging apparatus 10b is the same with the corresponding element in FIG. 19), or the first imaging apparatus 10a can include a lens assembly which can be the same or different with the optical photographing lens assembly of the present disclosure, and will not describe again herein. Furthermore, the first imaging apparatus 10a can include a first image sensor which can be disposed on the image surface of the lens assembly or the optical photographing lens assembly, and the second imaging apparatus 10b can include a second image sensor which is disposed on the image surface of the optical photographing lens assembly, wherein the arrangement can be the same as the image sensor 13 of the imaging apparatus 10 according to the 9th embodiment. Thus, in the 10th embodiment, the reference numeral of each of the first image sensor and the second image sensor is corresponding to the reference numeral of the image sensor 13 in the 9th embodiment.

11th Embodiment

Figure 21:
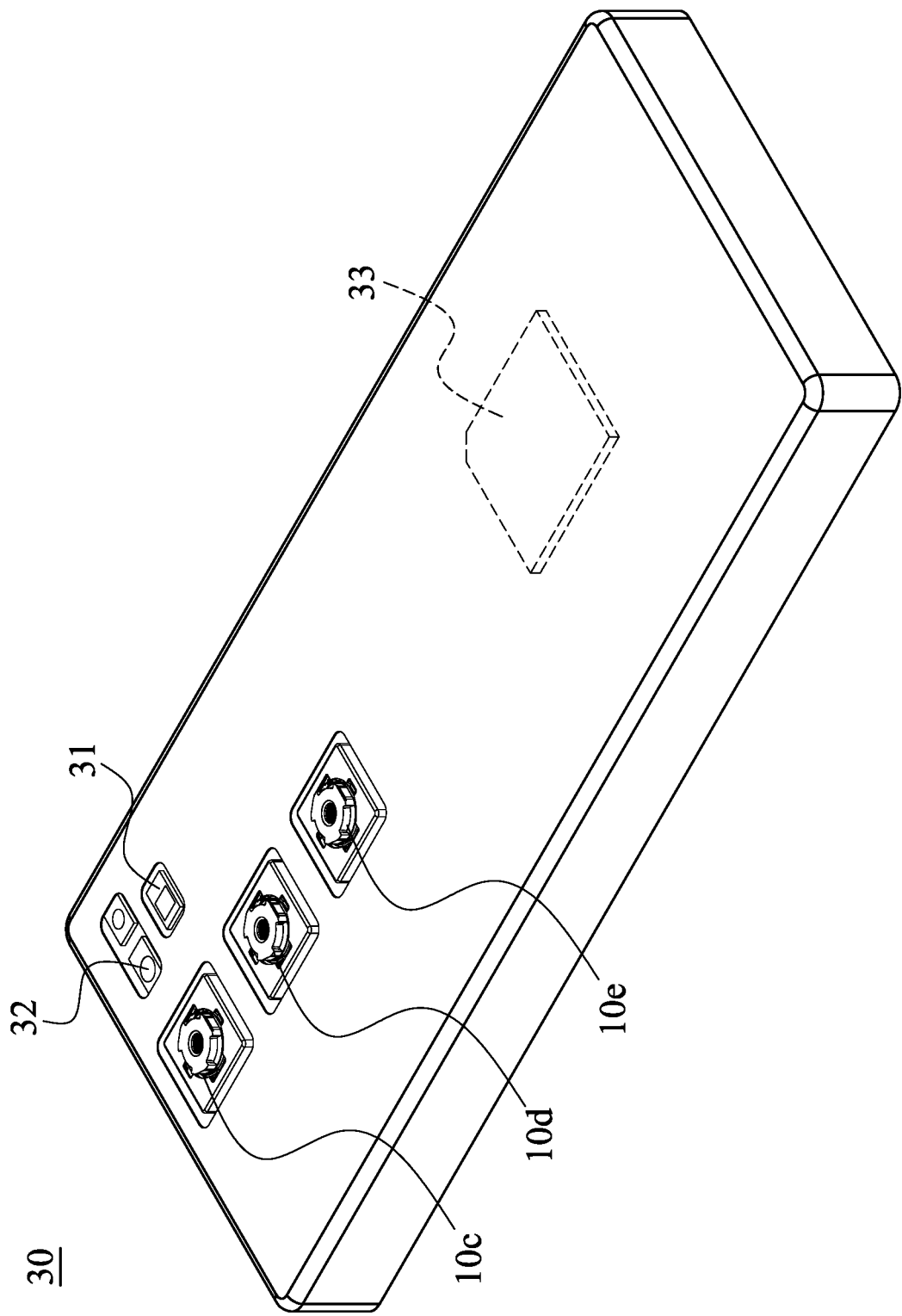
FIG. 21 is a schematic view of one side of an electronic device according to the 11th embodiment of the present disclosure.

FIG. 21 is a schematic view of one side of an electronic device 30 according to the 11th embodiment of the present disclosure. In FIG. 21, the electronic device 30 according to the 11th embodiment is a smartphone, wherein the electronic device 30 includes three imaging apparatus 10c, 10d, 10e, a flash module 31, a focusing assisting module 32, an image signal processor 33, a user interface (its reference numeral is omitted) and an image software processor (its reference numeral is omitted). When the user captures images of an imaged object (its reference numeral is omitted) via the user interface, the electronic device 30 focuses and generates an image via the imaging apparatus 10c, 10d, 10e while compensating for low illumination via the flash module 31 when necessary. Then, the electronic device 30 quickly focuses on the imaged object according to its object distance information provided by the focusing assisting module 32, and optimizes the image via the image signal processor 33 and the image software processor. Thus, the image quality can be further enhanced. The focusing assisting module 32 can adopt conventional infrared or laser for obtaining quick focusing, and the user interface can utilize a touch screen or a physical button for capturing and processing the image with various functions of the image processing software.

The imaging apparatus 10c, 10d, 10e according to the 11th embodiment is the same as the imaging apparatus 10 according to the 9th embodiment, and will not describe again herein. In detail, in the 11th embodiment, the imaging apparatus 10c, 10d, 10e can be a wide-angle imaging apparatus, a telephoto imaging apparatus and an imaging apparatus with general field of view (between the wide-angle and the telephoto), respectively, or can be others kind of imaging apparatus, and will not be limited thereto.

12th Embodiment

Figure 22:
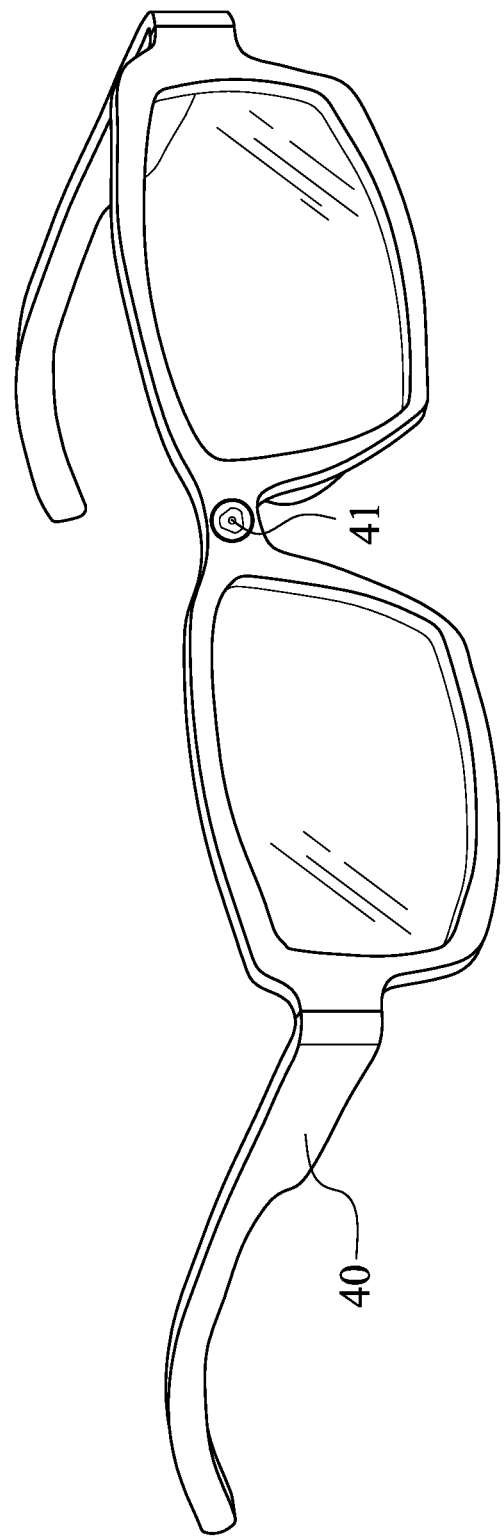
FIG. 22 is a schematic view of an electronic device according to the 12th embodiment of the present disclosure.

FIG. 22 is a schematic view of an electronic device 40 according to the 12th embodiment of the present disclosure. The electronic device 40 of the 12th embodiment is a wearable device, wherein the electronic device 40 includes an imaging apparatus 41, wherein the imaging apparatus 41 is the same as stated in the 9th embodiment, and will not describe again herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising seven lens elements, the seven lens elements being, in order from an object side to an image side:
a first lens element, a second lens element, a third lens element, a fourth lens element, a fifth lens element, a sixth lens element and a seventh lens element;
wherein the first lens element has negative refractive power;
the third lens element has positive refractive power;
the sixth lens element has positive refractive power; and
at least one of an object-side surface and an image-side surface of the seventh lens element comprises at least one inflection point;
wherein a focal length of the first lens element is f1, a focal length of the seventh lens element is f7, an axial distance between an object-side surface of the first lens element and an image surface is TL, a maximum image height of the optical photographing lens assembly is ImgH, a maximum refractive index of a single lens element of the optical photographing lens assembly is Nmax, a curvature radius of an object-side surface of the third lens element is R5, a curvature radius of an image-side surface of the third lens element is R6, and the following conditions are satisfied:

$|f1/f7|<1.50$;

$TL/ImgH<3.20$;

$1.550<Nmax<1.750$; and $-1.20<(R5+R6)/(R5-R6)$.

2. The optical photographing lens assembly of claim 1, wherein a focal length of the optical photographing lens assembly is f, an entrance pupil diameter of the optical photographing lens assembly is EPD, a half of a maximum field of view of the optical photographing lens assembly is HFOV, and the following conditions are satisfied:

$1.0<f/EPD\leq2.65$; and $45.0$ degrees$<HFOV<120.0$ degrees.

3. The optical photographing lens assembly of claim 1, wherein the fifth lens element has an image-side surface being convex in a paraxial region thereof, and there is an air gap between each of adjacent lens elements of the seven lens elements.

4. The optical photographing lens assembly of claim 1, wherein a maximum effective radius of the object-side surface of the first lens element is Y11, a maximum effective radius of the image-side surface of the seventh lens element is Y72, and the following condition is satisfied:

$0.55<Y11/Y72<0.95$.

5. The optical photographing lens assembly of claim 1, wherein the axial distance between the object-side surface of the first lens element and the image surface is TL, the maximum image height of the optical photographing lens assembly is ImgH, the focal length of the first lens element is f1, the focal length of the seventh lens element is f7, and the following conditions are satisfied:

$1.0<TL/ImgH<2.30$; and $|f1/f7|<0.65$.

6. The optical photographing lens assembly of claim 1, wherein the object-side surface of the seventh lens element is convex in a paraxial region thereof, the image-side surface of the seventh lens element is concave in a paraxial region thereof, the curvature radius of the object-side surface of the third lens element is R5, the curvature radius of the image-side surface of the third lens element is R6, and the following condition is satisfied:

$-0.60<(R5+R6)/(R5-R6)<5.0$.

7. The optical photographing lens assembly of claim 1, wherein a curvature radius of an object-side surface of the second lens element is R3, a curvature radius of an image-side surface of the second lens element is R4, a focal length of the optical photographing lens assembly is f, the axial distance between the object-side surface of the first lens element and the image surface is TL, the maximum image height of the optical photographing lens assembly is ImgH, and the following conditions are satisfied:

$-9.0<(R3+R4)/(R3-R4)<0.80$; and $1.0<(f+TL)/ImgH<2.90$.

8. The optical photographing lens assembly of claim 1, wherein at least one of the object-side surface and an image-side surface of the first lens element comprises at least one inflection point, a curvature radius of an object-side surface of the fifth lens element is R9, a curvature radius of an image-side surface of the fifth lens element is R10, and the following condition is satisfied:

$-8.0<(R9+R10)/(R9-R10)<0.80$.

9. The optical photographing lens assembly of claim 1, wherein an axial distance between the image-side surface of the seventh lens element and the image surface is BL, a focal length of the optical photographing lens assembly is f, and the following condition is satisfied:

$0.25<BL/f<0.85$.

10. The optical photographing lens assembly of claim 1, wherein an Abbe number of the second lens element is V2, an Abbe number of the fifth lens element is V5, an Abbe number of the seventh lens element is V7, and the following condition is satisfied:

$30.0<V2+V5+V7<115.0$.

11. The optical photographing lens assembly of claim 1, further comprising:
an aperture stop, wherein an axial distance between the aperture stop and the image-side surface of the seventh lens element is SD, an axial distance between the object-side surface of the first lens element and the image-side surface of the seventh lens element is TD, and the following condition is satisfied:

$1.20<TD/SD<2.0$.

12. The optical photographing lens assembly of claim 1, wherein a sum of axial distances between all adjacent lens elements of the optical photographing lens assembly is ΣAT, a sum of central thicknesses of all lens elements of the optical photographing lens assembly is ΣCT, and the following condition is satisfied:

$0.10<\Sigma AT/\Sigma CT<0.65$.

13. The optical photographing lens assembly of claim 1, wherein a central thickness of the second lens element is CT2, a central thickness of the seventh lens element is CT7, and the following condition is satisfied:

$0.85<CT7/CT2<1.85$.

14. An imaging apparatus, comprising:
the optical photographing lens assembly of claim 1; and
an image sensor disposed on the image surface of the optical photographing lens assembly.

15. An electronic device, comprising at least two imaging apparatuses, the at least two imaging apparatuses comprise:
a first imaging apparatus and a second imaging apparatus, wherein the first imaging apparatus and the second imaging apparatus face toward a same direction, and each of the first imaging apparatus and the second imaging apparatus has a single focus;
wherein the first imaging apparatus comprises a lens assembly and a first image sensor, the first image sensor is disposed on an image surface of the lens assembly, and the first imaging apparatus has a field of view ranging between 60 degrees and 90 degrees;
wherein the second imaging apparatus comprises the optical photographing lens assembly of claim 1 and a second image sensor, the second image sensor is disposed on the image surface of the optical photographing lens assembly, and the second imaging apparatus has a field of view ranging between 90 degrees and 180 degrees.

16. An optical photographing lens assembly comprising seven lens elements, the seven lens elements being, in order from an object side to an image side:
a first lens element, a second lens element, a third lens element, a fourth lens element, a fifth lens element, a sixth lens element and a seventh lens element;
wherein the first lens element has negative refractive power;
the third lens element has positive refractive power;
the sixth lens element has positive refractive power; and
at least one of an object-side surface and an image-side surface of the seventh lens element comprises at least one inflection point;
wherein a focal length of the first lens element is f1, a focal length of the seventh lens element is f7, an axial distance between an object-side surface of the first lens element and an image surface is TL, a maximum image height of the optical photographing lens assembly is ImgH, a half of a maximum field of view of the optical photographing lens assembly is HFOV, a curvature radius of an object-side surface of the third lens element is R5, a curvature radius of an image-side surface of the third lens element is R6, and the following conditions are satisfied:

$|f1/f7|<3.0;$ $TL/ImgH<3.20;$ $1/|\tan(HFOV)|<1.0;$ and $-1.20<(R5+R6)/(R5-R6)<10.0.$ 17. The optical photographing lens assembly of claim 16, wherein the fifth lens element has negative refractive power, and at least one of an object-side surface and an image-side surface of the sixth lens element comprises at least one inflection point.

18. The optical photographing lens assembly of claim 16, wherein a focal length of the second lens element is f2, a focal length of the fourth lens element is f4, and the following condition is satisfied:

$-0.45<f4/f2<2.50.$

19. The optical photographing lens assembly of claim 16, wherein the third lens element has an object-side surface being convex in a paraxial region thereof, and the fifth lens element has an image-side surface being convex in a paraxial region thereof.

20. The optical photographing lens assembly of claim 16, wherein the half of the maximum field of view of the optical photographing lens assembly is HFOV, and the following condition is satisfied:

$1/|\tan(HFOV)<0.75.$

21. The optical photographing lens assembly of claim 16, wherein the curvature radius of the object-side surface of the third lens element is R5, the curvature radius of the image-side surface of the third lens element is R6, and the following condition is satisfied:

$-0.05<(R5+R6)/(R5-R6)<2.0.$

22. The optical photographing lens assembly of claim 16, wherein a curvature radius of an object-side surface of the second lens element is R3, a curvature radius of an image-side surface of the second lens element is R4, and the following condition is satisfied:

$-9.0<(R3+R4)/(R3-R4)<-1.50.$

23. The optical photographing lens assembly of claim 16, wherein a central thickness of the second lens element is CT2, a central thickness of the seventh lens element is CT7, and the following condition is satisfied:

$0.75<CT7/CT2<2.0.$

24. The optical photographing lens assembly of claim 16, wherein there is an air gap between each of adjacent lens elements of the seven lens elements, a curvature radius of the image-side surface of the seventh lens element is R14, a maximum effective radius of the image-side surface of the seventh lens element is Y72, and the following condition is satisfied:

$0<R14/Y72<1.0.$

25. An optical photographing lens assembly comprising seven lens elements, the seven lens elements being, in order from an object side to an image side:
a first lens element, a second lens element, a third lens element, a fourth lens element, a fifth lens element, a sixth lens element and a seventh lens element;
wherein the first lens element has negative refractive power;
the second lens element has an object-side surface being convex in a paraxial region thereof and an image-side surface being concave in a paraxial region thereof;
the third lens element has positive refractive power;
the sixth lens element has positive refractive power; and
at least one of an object-side surface and an image-side surface of the seventh lens element comprises at least one inflection point;
wherein a focal length of the first lens element is f1, a focal length of the seventh lens element is f7, an axial distance between an object-side surface of the first lens element and an image surface is TL, a maximum image height of the optical photographing lens assembly is ImgH, a focal length of the optical photographing lens assembly is f, an entrance pupil diameter of the optical photographing lens assembly is EPD, a focal length of the third lens element is f3, and the following conditions are satisfied:

$|f1/f7|<1.50;$ $TL/ImgH<4.70;$ $1.20 < f/\text{EPD} \leq 2.40$; and $0.43 < f/f3 < 1.20$.

26. The optical photographing lens assembly of claim 25, wherein the axial distance between the object-side surface of the first lens element and the image surface is TL, the maximum image height of the optical photographing lens assembly is ImgH, an Abbe number of the seventh lens element is V7, and the following conditions are satisfied:

$TL/\text{ImgH} < 4.0$; and $10.0 < V7 < 45.0$.

27. The optical photographing lens assembly of claim 25, wherein the focal length of the optical photographing lens assembly is f, the entrance pupil diameter of the optical photographing lens assembly is EPD, an axial distance between the image-side surface of the seventh lens element and the image surface is BL, the maximum image height of the optical photographing lens assembly is ImgH, and the following conditions are satisfied:

$1.20 < f/\text{EPD} \leq 2.20$; and $BL/\text{ImgH} < 0.50$.

28. The optical photographing lens assembly of claim 25, wherein a curvature radius of the object-side surface of the seventh lens element is R13, a curvature radius of the image-side surface of the seventh lens element is R14, and the following condition is satisfied:

$-0.20 < (R13-R14)/(R13+R14) < 1.0$.

29. The optical photographing lens assembly of claim 25, wherein a central thickness of the sixth lens element is CT6, a central thickness of the seventh lens element is CT7, and the following condition is satisfied:

$0.15 < CT7/CT6 < 0.85$.

30. The optical photographing lens assembly of claim 25, wherein a maximum effective radius of the object-side surface of the first lens element is Y11, a maximum effective radius of the image-side surface of the seventh lens element is Y72, a distance perpendicular to an optical axis between an inflection point on an object-side surface of the sixth lens element closest to the optical axis and the optical axis is Yp61, a distance perpendicular to the optical axis between an inflection point on an image-side surface of the sixth lens element closest to the optical axis and the optical axis is Yp62, the focal length of the optical photographing lens assembly is f, and one of the following condition is satisfied:

$0.20 < Y11/Y72 < 1.0$; and $0 < Yp61/f < 1.50$; or $0.20 < Y11/Y72 < 1.0$; and $0 < Yp62/f < 1.50$.

* * * * *